(12) United States Patent
Ciciriello

(10) Patent No.: US 11,698,287 B2
(45) Date of Patent: Jul. 11, 2023

(54) SYSTEM AND METHOD FOR DETECTING VIBRATIONS IN ROTATING MACHINERY

(71) Applicant: Rolls-Royce Deutschland Ltd & Co KG, Blankenfelde-Mahlow (DE)

(72) Inventor: Lucia Ciciriello, Potsdam (DE)

(73) Assignee: ROLLS-ROYCE DEUTSCHLAND LTD & CO KG, Blankenfel De-Mahlow (DE)

( * ) Notice: Subject to any disclaimer, the term of this patent is extended or adjusted under 35 U.S.C. 154(b) by 96 days.

(21) Appl. No.: 17/332,300

(22) Filed: May 27, 2021

(65) Prior Publication Data
US 2022/0065688 A1 Mar. 3, 2022

(30) Foreign Application Priority Data

Aug. 31, 2020 (EP) ..................................... 20193640
Oct. 29, 2020 (DE) .......................... 102020128486.1

(51) Int. Cl.
*G01H 1/00* (2006.01)
*F01D 21/00* (2006.01)

(52) U.S. Cl.
CPC ........... *G01H 1/006* (2013.01); *F01D 21/003* (2013.01); *F05D 2270/334* (2013.01)

(58) Field of Classification Search
CPC .. G01H 1/006; F01D 21/003; F05D 2270/334
See application file for complete search history.

(56) References Cited

U.S. PATENT DOCUMENTS

2004/0041478 A1* 3/2004 Ohtachi .............. F16C 32/0444
  310/90.5
2011/0215750 A1* 9/2011 Andersen ............... H02K 11/20
  310/68 B (Continued)

FOREIGN PATENT DOCUMENTS

DE  112018001755 T5  12/2019
EP       2811278 A1  12/2014

(Continued)

OTHER PUBLICATIONS

European Search Report dated Feb. 25, 2021 from counterpart European Patent Application No. 20193640.8.

(Continued)

*Primary Examiner* — Natalie Huls
*Assistant Examiner* — Cynthia L Davis
(74) *Attorney, Agent, or Firm* — Shuttleworth & Ingersoll, PLC; Timothy Klima

(57) ABSTRACT

Embodiments of the invention are shown in the figures, where a system for vibration detection is shown, the system comprising: one or more drivelines including a rotatable component rotatable about a rotational axis relative to another component; an electrical machine having a rotor and a stator rotatable with respect to one another, the rotor being arranged to at least one of drive and be driven by a part of the driveline, the electrical machine being adapted to provide signals indicative for at least one of a motion and a force between the rotor and the stator and a torque applied on the rotor; and an analysis unit adapted to receive the signals and to detect a vibration signature of the rotatable component with respect to the other component based on the signals.

20 Claims, 19 Drawing Sheets

(56) References Cited

U.S. PATENT DOCUMENTS

2014/0230555 A1* 8/2014 Cerny .................. F01D 25/164
  73/593
2017/0297679 A1* 10/2017 Elliott .................... B64D 35/08

FOREIGN PATENT DOCUMENTS

| EP | 2838185 A1 | 2/2015 | |
| WO | WO-2010040966 A1 * | 4/2010 | ........... F01D 21/003 |
| WO | 2016143882 A1 | 9/2016 | |

OTHER PUBLICATIONS

Corne Bram et al: "Stator current measurements as a condition monitoring technology—The-state-of-the", 2014 International Conference on Electrical Machines (ICEM), IEEE, Sep. 2, 2014 (Sep. 2, 2014), pp. 1659-1665, XP032687772, DOI: 10.11 09/ICELMACH. 2014.6960405 [retrieved on Nov. 17, 2014.

* cited by examiner

SYSTEM AND METHOD FOR DETECTING VIBRATIONS IN ROTATING MACHINERY

REFERENCE TO RELATED APPLICATIONS

This application claims priority to European Patent Application No. 20 193 640.8 filed on Aug. 31, 2020, and to German Patent Application No. 10 2020 128 486.1 filed on Oct. 29, 2020, the entirety of which is incorporated by reference herein.

BACKGROUND

The present disclosure relates to a system and method for rotor vibration detection, and to an engine for an aircraft.

A common problem in the field of rotating machinery is controlling the level of vibration. Vibration may be caused by imbalances and misalignment of rotating parts, such as a shaft and supported rotatable elements, such as, e.g., compressor and turbine discs and blades in gas turbine engines, and also external forcing such as, e.g., aircraft maneuvers and aerodynamic forces in the aircraft.

In hydrodynamic journal bearings, for example, fluid-excited instabilities may occur at certain operating conditions, in particular at high speeds due to the variation of the gap, or clearance, between the rotor and the stator which is filled by oil. Oil film induced vibrations may cause additional dynamic (in particular cyclic) displacements onto the rotor (e.g., journal) with the effect of increasing the orbits of the rotors. Precession orbits may appear in superposition with the journal spinning and appear combined in different ways depending on the possibilities given by the system clearances and degrees of freedom of the journal shaft (e.g., a system where the axes of the journals are carried in precession may present several onsets of orbiting, each one corresponding to specific frequencies in the vibration signature. Precession orbits can be backwards or forwards with respect to the journal sense of rotation and this also change the frequency in the vibrational signature. Even though backward orbits are possible, in most of the cases the rotor orbits induced by oil film are travelling in forward direction. Oil film induced vibrations can increase the shaft orbits or, in case the shaft is prevented to orbit any further, in turn may further variate the oil film gap and, therefore, the oil pressure distribution. By this, also the rotor clearances and the shaft alignment may be influenced to a point where the displacements and rotations exceed the nominal design conditions. Also the misalignment of the journal (rotation about a longitudinal axis) can generate gap variations that may have the effect of inducing rotor orbits, which in this specific case are travelled at twice the fundamental frequency of the rotor. It is worth noticing that axial vibration may also be generated in superposition to the rotor orbits. The oil film induced vibrations can appear both in a stable or instable onset, the difference depending on whether the magnitude of the vibration remains constant versus time, in stationary speed and loads, or increases rapidly also at steady conditions.

Stable oil film-induced vibrations are often indicated with the term oil whirl (wherein the term whirl relates to orbits), whilst with the term the oil whip vibrations generated by the oil film orbit coincident with a rotor resonance having a divergent, instable behavior are indicated. The oil whip has the same mechanism as the oil whirl but can be more critical and is almost always instable, because in this case the periodic force induced by the orbit of oil film becomes able to excite a rotor resonance. Even though this distinction is correct in most cases, there are also instable oil whirl and relatively stable oil whip (the latter being anyways dangerous because the rotor can suddenly become incontrollable causing metal to metal contacts).

Oil whirl orbiting can be sub-synchronous or synchronous with respect to the rotor. Whether the precessional orbit is travelled by a journal at about half of the rotor speed or at a speed close or equal to the rotor speed, depends on the internal pressure and temperature distribution in the oil film which are determined by speed and load conditions. The frequency at which the precessional orbit is travelled is related to the average tangential speed of the oil film mass contained in the journal bearing. In case of orbits travelled at 2× revolution orbits due to misalignment, the oil film average rotational speed does not influence directly the frequency of the orbits and axial vibration, but may have an effect on the magnitude of such vibration. When oil whirl and oil whip set in, hydraulic forces may destabilize and increase the motion of the rotor and induce a self-excited vibration. Such a vibration typically has very high amplitudes. In turn, the rotor can be forced into a large eccentricity that could even lead to a collision with another component. This effect may thus reduce the lifetime of the journal bearing or could even cause a sudden failure. Particularly stiffer rotor systems with reduced clearances are prone to detrimental oil film instability when the journal bearing undergoes high loads and speeds. Vibrations induced by gap variations may also be present in oil and air seals. In particular, the unwanted forces that are generated by the oil film that becomes constrained in a reduced gap by the shaft deformation, offset and misalignment may develop periodic forces of a magnitude capable to make the rotor to precession a sub-synchronous orbit.

Similar effects related to rotor vibration and orbits generated under the effect of gap-dependent unbalanced forces onto the rotors occur at other types of rotatable components, and also in rotating systems with fluids other than oil, e.g., in systems with gases or gas mixtures, such as air, in a gap between the rotating components. As an example, a non-uniform blade tip clearance distribution of a turbine disc due to a displacement of a rotor shaft during vibration may produce a force that causes additional rotor orbits, superimposed to its spin, that may generate vibrations at a frequency lower than the rotor fundamental frequency. Similarly to the journal bearing oil whip and whirl, the gap-dependent vibration can appear with orbits and vibration that have frequency coincident to the rotor frequency. This case can be seen as an extreme case of a vibration that starts sub-synchronous and builds up until the frequency of the orbits becomes equal to the rotor spin frequency. Vibrations that are here referred to as induced by gap-dependent forces can also be related with the generic sub-synchronous or non-synchronous vibration. If the damping is not enough, gap-dependent vibration in turbines can force the respective rotor to travel on precession orbits that are able to create an instability. Such gap-dependent unbalanced forces are commonly referred to as Alford forces. Corresponding forces in compressors are often referred to as Wachel forces. In electrical machines, e.g., in electric motors, in electric generators and in magnetic bearings, corresponding effects related to the variation of the gap between rotors and stators and the correspondent magnetic flux variation. In electric machines the gap-dependent vibrations generated form within the drive are commonly compensated by coils and circuits that aim at suppressing the unbalanced pull lead to a phenomenon typically referred to as unbalanced magnetic pull. The vibrations due to gap-dependent forces are generated by the reaction of oil, air or magnetic fields to the changes mainly in the radial gaps between rotors and stators that are not symmetrical in circumferential direction, in filling cavities, bearing chambers and the like. It is worth noting that the variation of the gap also in axial direction can generate vibration but in general they are not sub-synchronous.

While such vibrations due to gap-dependent forces may lead to an increased wear of parts of the machinery, a rapid deterioration of performances, power and torque modulation, or even a failure of these parts, it has been difficult to detect an onset of these forces, especially when acting simultaneously on many rotors, e.g., like in an aircraft engine, early enough and in a reliable manner.

SUMMARY

It is an object to provide a precise and early detection of vibrations due to gap-dependent forces.

According to an aspect there is provided a system for vibration detection. The system comprises one or more driveline(s) including a rotatable component rotatable about a rotational axis relative to another component, wherein a fluid (such as oil or air) is arranged in a clearance between the rotatable component and the other component. The system further comprises an electrical machine (e.g., an electric motor and/or generator or a magnetic bearing) having a rotor and a stator rotatable with respect to one another. The rotor of the electrical machine is arranged to drive and/or to be driven by, or support, a part of the driveline (e.g., by and/or via the rotatable component). Therein, the electrical machine is adapted to provide signals that are indicative for a motion and/or of a force and/or a torque (in particular indicative for sub-synchronous to synchronous orbits; when one or more rotors are connected to the electrical machine, different frequencies correspondent to different onsets; the onset of gap-dependent orbits of each rotor can be isolated and amplified within the drive circuits, so that each characteristic frequency can be identified and monitored) between the rotor and the stator, or applied on the rotor, respectively. The system further comprises an analysis unit adapted to receive the signals from the electrical machine, and to detect a vibration signature of the rotatable component with respect to the other component based on the signals received from the electrical machine (or of rotatable components in series or parallel (e.g. shafts in series or planets of a power gearbox that are in parallel connected to an electrical motor drive; advantageously, also beating frequencies (sidebands) can be detected within the drive, e.g., generated by cross-shaft vibration when the rotational speed ratio of two different rotors approaches integer conditions). Optionally, the analysis unit is further adapted to generate a command based on the detection of the vibration signature. The analysis unit may be adapted to send this command to the electrical machine and/or a control system, such as an engine FADEC (full authority digital engine control).

This is based on the finding that when an electrical machine, such as an electrical drive, is connected to the rotatable component, unbalanced magnetic forces are induced in the electrical machine as a consequence of asymmetrical gap-dependent forces being generated on other rotors (i.e., outside the electrical machine, connected with the electrical machine, but different, particularly displaced thereof), because of a loss of alignment somewhere in the driveline. Therefore, the electrical machine may serve as a vibration sensor for components of the driveline external of the electrical machine. Indeed, since the electrical machine is operatively connected to the driveline, it could be regarded as an intrinsic vibration sensor that allows improved measurement accuracy with respect to external sensors, and with particularly short response times. Thus, the system allows a particularly precise and early detection of vibrations due to gap-dependent forces., as well as of the related synchronous and super synchronous (e.g., 2, 3, 4 or 5 times the rotor frequency; the analysis unit may be adapted to monitor these frequencies) vibration that are generated by a loss of alignment in the engine driveline.

For example, the signals are indicative for asymmetric magnetic forces in the electrical machine. Alternatively or in addition, the signals are generated based on asymmetric magnetic forces in the electrical machine, e.g., measured by the electrical machine. This allows a particularly high precision of the measurement.

The electrical machine may comprise a plurality of electrically conductive coils. Optionally, the signals are indicative for and/or based on differences among voltages and/or electrical currents of (at and/or in) the plurality of coils, e.g., between at least one coil and at least one other (e.g., opposing) coil. This may be indicative for an asymmetric arrangement of the rotor relative to the stator of the electrical machine, which may be the direct result of a corresponding asymmetry of the rotatable component relative to the other component, and a corresponding asymmetry in the clearance between these components. Such a measurement allows particularly fast response times.

The rotor of the electrical machine and the rotatable component are in operative connection. For example, the rotor of the electrical machine and the rotatable component are connected such that a rotation of one of these parts effects a rotation of the other of these parts. Optionally, the rotor of the electrical machine and the rotatable component are fixedly connected to one another (or at least rotationally fixed with respect to one another). Also a number of rotatable components in series or in parallel connected in sequence to one or more electrical drives are conceivable.

The analysis unit may be adapted to perform a frequency analysis. The analysis unit may be adapted to determine a property of a vibration signature, e.g., within one or more predetermined frequency range(s), based on the signals at the different points in time. Optionally, the predetermined frequency range depends on the speed and/or performance regulation (e.g., a state defined by torque, power, altitude, speed, temperature, pressure, fuel intake, and/or variable vanes etc.) of the rotatable component (or of another rotating part of the driveline). Optionally, the analysis unit is adapted to generate a command based on a comparison of the property of the vibration signature with a predetermined threshold. An example of a vibration signature is a peak in a frequency spectrum of the signals. This allows a particularly precise and early detection of certain vibrations of the rotatable component. Due to the mutual influence that rotor vibrations and performance deterioration have in aircraft engines, vibration level and the state of the engine in terms of performance regulation parameters is integrated and compared to baselines (e.g., orbits versus fuel consumption and/or the like) in various embodiments. It is worth noting that optional active controllers can mistune integer speed ratio conditions (of two rotatable components) and, e.g., target a speed ratio close to an irrational ratio of speeds.

According to an aspect, a system for vibration detection is provided, comprising a driveline including a rotatable component rotatable about a rotational axis relative to another component, wherein a fluid is arranged in a clearance between the rotatable component and the other component; a sensor adapted to provide signals indicative for a motion (in particular for an orbiting motion and/or for a vibration, i.e., a vibratory motion) and/or a force between two components (e.g., of said rotatable component and said other component) and/or a torque applied on one or more component(s) of the driveline at different points in time; and an analysis unit adapted (a) to receive the signals and (b) to determine a property of a vibration signature within a predetermined frequency range based on the signals at the different points in time. The analysis unit can thus detect changes of the vibration signature property between the different points in time.

This allows a particularly precise and early detection of certain vibrations and orbits of the rotatable component, because vibrations at frequencies that are characteristic for gap-dependent forces of certain components in the driveline may be monitored. These frequency ranges may be calculated by FEM, look up tables and/or experimental vibration surveys. An increase in magnitude, change of the phase and/or change of the frequency of such signatures may serve as an early warning that indicates a potential incoming fluid instability, even (long) before other, general vibration alarms may be raised by exceeding a total vibration threshold. In addition, the augment of orbits and vibrations generated by gap-dependent forces are related to the cause that generated the gap variation, which may be related to a deterioration in the engine alignment. That is, while the overall vibration and the vibration at the rotor frequency (1/Rev) and at 2/Rev of the rotor frequency may still be well within the design limits, the system described herein allows to identify an onset of a potential strong source of vibration before the vibration actually builds up strongly. In addition, the earlier detection of the source of vibration allows to instate a troubleshooting task in order to find in which specific engine module the deterioration in the rotor alignment is taking place. Possible (quick) alternatives for counteracting a gap-dependent critical vibration (meantime that their cause that is a deterioration in the initial alignment between rotors and stators is reinstated) or instability are to decrease the power, torque and/or mistuning speed and/or to alter pressure and/or temperature of air and oil, respectively, modifying the engine performance regulation state of the rotatable component with the effect of reducing centrifugal and torque loads (and aerodynamic loads on blades with the consequent effect of reducing the amplitude of the gap-dependent forces and related orbits) and/or exit a known resonance condition. However, this has an impact on the operation of the rotatable component, potentially limiting an operative envelope (e.g., of an aircraft having the rotatable component) which does not comply with (e.g., airframe) requirements. On the other hand, a local change of the pressure and/or temperature and/or flow intake of the fluid in the clearance may be possible without restricting the flight envelope in operations. In addition, reducing the pressure can be effected very quickly. Besides temporary solutions that aim at changing the operational state of the engine, a highly effective solution to reduce or eliminate gap-dependent and synchronous vibration is to restore the nominal condition of alignment in the engine driveline. The deterioration of engine alignment is in fact mostly the main source of sub-synchronous gap-dependent, synchronous and super synchronous vibration (e.g., 2×, 3×, 4×, . . . number of blades×rotor frequency, number of teeth×rotor frequency etc.). In particular in the field of gas turbines, and even more particular in the field of gas turbine engines for aircrafts, this is of particular relevance. Sub-synchronous vibration generated by variation of gaps and clearances such as the critical oil film vibrations and instabilities may appear as a particular vibration signature (e.g., with a known frequency, phase and/or amplitude that may have been measured or simulated in advance). The analysis unit may store known (potential) signatures and their properties for comparison with vibration signatures in the received signals. Monitoring the onset of such vibration or instability allows to react quickly, if necessary, but above all allows an early detection of a loss of alignment of one or more engine rotors due to component deterioration provoked by wear and tear or unconformities in the design and or manufacturing of engine assembly. This allows an improved control of aerodynamic and hydrodynamic vibrations and instabilities, so that the lifetime and security of the journal bearing—or other rotatable components—can be improved, and the costs related to maintenance can be reduced by planning tasks with an augmented level of confidence.

The frequency of the vibration may directly be measured, or it may be determined using Fourier transformation, e.g., implemented as fast Fourier transformation (FFT), e.g., based on the received signals. Optionally, one or more predefined threshold(s) for frequency, phase and/or vibration amplitude(s) is/are defined, e.g. in a look-up table. This allows to define a baseline, or nominal acceptable operational conditions, (for both whole engine vibration levels and performance regulations) to compare the monitored data and exclude false positives.

Optionally, the electrical machine described further above acts as (and is used as) the sensor. This allows to particularly improve the quality and response time of the measurement, and it is even not necessary to add an additional sensor to perform the measurement, what allows to save space, weight and cost.

The analysis unit may be further adapted to generate a (single or multiple logic of a) command based on a comparison of the property of the vibration signature with a predetermined threshold. That can define the range of nominal engine conditions (vibration and performance) expected to be aligned with the stress levels certified and included in a normal functioning condition. For example, maintenance protocols may be activated in response to the generation of the command (in particular in order to restore the nominal alignment of one or more engine rotors, such as turbines, fans, compressors). Alternatively or in addition, an active means to modify the pressure and/or temperature of the fluid in the clearance may be triggered. The active means may be adjustable in response to the command. For example, the active means is a servo valve that is adapted to change the pressure of the fluid in the clearance.

Examples for the property of the vibration signature are a frequency, a phase and an amplitude, e.g., of a peak in a frequency spectrum. One, two or all thereof may be used to describe and analyze the signals. The system may further comprise at least one sensor to measure a phase of a vibration signature with respect to at least one rotating part, e.g., the rotatable component. Alternatively or in addition, the system may comprise one or more sensors to measure fluid (e.g., oil or air) pressure and/or one or more sensors to measure fluid (e.g., oil or air) temperature of the fluid in the clearance. An optional active control can disrupt the fluid (e.g., oil or air) instability by changing fluid pressure and/or temperature. The system may be adapted to measure and/or receive a value of a torque and/or power transmitted by the rotatable component. It is worth noting that that for applications at engines, e.g., gas turbine engines, engine speed and power (or torque) signals may be made available to the analysis unit (e.g., obtained from a FADEC of the engine). Optionally, the analysis unit is adapted to determine a change of a phase of the vibration signature, and to provide a control signal based on the change of the phase. Phase measurements allow to distinguish whether a synchronous vibration is induced by gap-dependent forces or by other causes (for instance rotor unbalance, couplings that operate out of an allowable offset and misalignment range, electrical motor distortions etc.). A trend analysis on amplitudes of vibration signatures determined using an FFT may be carried out by the analysis unit, in particular at relevant (e.g., predefined) frequencies (at which the gap-dependent vibration is expected to appear, e.g., by analytical and/or FEM calculations for a given journal bearing design). This analysis may be continuously carried out and/or the results compared with a look-up table of thresholds based on the radial and/or axial clearances. In this manner, the risk of a metal-to-metal contact may be noticeably reduced by means of an active controlled action taking place.

Optionally, the rotatable component and the other component are parts of a driveline that comprises a turbine and/or a compressor. The driveline may be adapted for an engine, e.g., a gas turbine engine, in particular a hybrid gas turbine engine that can be driven by the combustion of fuel, and that can also be driven by providing an electrical current to the electrical machine. For example, the rotatable component itself is a turbine, a compressor, a shaft, a gear wheel, a part of an oil seal, a part of a bearing (rolling bearing or magnetic bearing), or a part of a squeeze film damper. According to one example, the rotatable component is a planet gear of an epicyclic gearbox, and the other component is a planet carrier of the epicyclic gearbox. Notably, in some applications, planet gears in epicyclic gearboxes are rotated at very high speeds and under high loads.

The analysis unit may be adapted to determine whether the received signals comprise a vibration signature with a frequency within the predetermined frequency range, and/or with an amplitude above a predefined threshold. The signals from different shafts may be combined and/or frequencies due to cross-shaft vibration can be monitored and trends can be detected. One or more active signal(s) can be sent to one or more engine controller(s), e.g., one or more speed controller(s) in order to mistune an integer speed ratio between shaft speeds. Optionally, an irrational ratio speed ratio can be commanded to reduce cross-shaft vibrations. The threshold for the amplitude of such a signature may be set much lower than other vibration thresholds, so that a detection of potentially critical vibrations is possible before the overall vibration level actually becomes detrimental.

For example, the predefined range is below 1.0, between 0.1 and 1.0, or between 0.1 to 0.5 times a rotational speed of the driveline, e.g., the rotational speed of the rotatable component with respect to the other component. Particularly in this range, potentially critical signatures may be detected. A frequency that is synchronous with the rotational speed of the rotatable component corresponds to the rotational speed of the rotatable component relative to the other component (expressed in Hz). A frequency range adjacent synchronicity may range from 0.6 to 1.0 times the rotational speed of the rotatable component.

According to an aspect, a system is provided, in particular according to any of the previously described aspects, embodiments and/or individual features. The system comprises at least one driveline including a rotatable component (e.g., a shaft) rotatable about a rotational axis relative to another component (e.g., another shaft, a static structure such as a nacelle, a stator of an electrical machine or the like); at least one electrical machine having a rotor and a stator rotatable with respect to one another, the rotor being arranged to drive and/or to be driven by a part of the driveline, the electrical machine being adapted to provide signals indicative for a motion and/or a force between the rotor and the stator and/or a torque applied on the rotor; and an analysis unit adapted to receive the signals and to detect a vibration signature of the rotatable component of the driveline with respect to the other component based on the signals.

According to another aspect, a system is provided, in particular according to any of the previously described aspects, embodiments and/or individual features. The system comprises two or more drivelines, each including a rotatable component rotatable about a rotational axis relative to another component; two or more electrical machines, each having a rotor and a stator rotatable with respect to one another, the rotor being arranged to drive and/or to be driven by a part of a different one of the drivelines, each of the electrical machines being adapted to provide signals indicative for a motion and/or a force between the respective rotor and stator and/or a torque applied on the respective rotor; and an analysis unit adapted to receive the signals and to detect a vibration signature of at least one of or each of the rotatable components of the two or more drivelines with respect to the respective other component based on the signals.

By these aspects, a possible cross-shaft vibration can be very effectively and precisely monitored. This also allows to effectively disrupt such a cross-shaft vibration. In a cross-shaft vibration a vibration of one shaft, e.g., the rotatable component or fixedly connected thereto, may excite a vibration of another shaft, e.g., another rotatable component or fixedly connected thereto. If a resonance is excited this can lead to very strong resulting vibrations. The use of the electrical machine(s) to determine vibrations of other parts in the driveline allows to detect such cross-shaft vibrations with high precision. By modifying current through one or more coils of at least one electrical machine based on the detected vibration signatures the cross-shaft vibration can be disrupted.

Optionally, the analysis unit is adapted to control at least one controllable device of the system based on the vibrations detected with the electrical machine or with both of the two or more electrical machines. For example, the at least one controllable device is or comprises the or an electrical machine. As another example, the at least one controllable device is or comprises a turbomachine or a part thereof. As yet another example, the at least one controllable device is or comprises a magnetic bearing.

Thus, the analysis unit may be adapted to control the electrical machine or one or all of the electrical machines of the system based on the vibrations detected with the electrical machine or with both of the two or more electrical machines.

For example, the rotor of the electrical machine (or the rotors of the two or more electrical machines) are rotatable with a variable ratio of speeds with respect to one another. Optionally, the analysis unit is further adapted for controlling rotation of at least the rotor of one of the electrical machines depending on a speed ratio R of speeds of the rotors. By this, cross-shaft excitations can be very effectively and precisely be controlled.

According to an embodiment the analysis unit is further adapted for controlling rotation of at least the rotor of the electrical machine (or of one of the electrical machines) depending on the speed ratio R so as to avoid an integer ratio of speeds of the rotors of the electrical machines and/or of the rotor of the electrical machine and another rotatable component such as an engine shaft.

Optionally, the analysis unit is adapted for controlling rotation of the rotor of the electrical machine (or of one of the electrical machines) depending on the speed ratio so as to avoid speed ratios R within an interval around an integer Ri. As an example, the interval may be defined as ($^2\sqrt{(Ri^2-k)}$, $^2\sqrt{(Ri^2+k)}$), wherein k is an integer. This allows to particularly effectively avoid speed ratios that are prone to excite strong vibrations.

According to an embodiment controlling rotation of the rotor of the electrical machine (or the rotor of one of the electrical machines) depending on the speed ratio R comprises restricting the rotation of the rotor of the electrical machine (or the rotors of the electrical machines) to predetermined speed ratios. These may be one or more intervals adjacent an avoided interval described above and/or one or more intervals between two or more avoided intervals described above.

Optionally, the analysis unit is further adapted to determine a frequency of an orbiting motion of the rotor of the at least one electrical machine. The analysis unit may use the signals from the electrical machine for this determination. The orbiting motion corresponds to a motion of the axis of rotation of the rotor of the electrical machine relative to the stator thereof.

Optionally, the analysis unit is further adapted to determine a time and/or a phase delay of signals measured by means of at least two coils of the at least one electrical machine. By this, the orbiting motion may be characterized with high precision.

According to an aspect, a system is provided, in particular according to any of the previously described aspects, embodiments and/or individual features. The system comprises one or more drivelines including a rotatable component rotatable about a rotational axis relative to another component; at least one electrical machine having a rotor and a stator rotatable with respect to one another, the rotor being arranged to drive and/or to be driven by a part of the driveline, wherein the rotor of the electrical machine is rotatable about an axis that forms an angle with the rotational axis of the rotatable component with respect to the other component. This allows, among others, to determine axial vibrations and movements of the rotatable component along the rotational axis particularly precisely.

According to an embodiment, the axis and the rotational axis are perpendicular with respect to one another. By this the precision may be further improved.

For example the rotor of the electrical machine is rotatably supported by a magnetic bearing. This allows an active control by means of the magnetic bearing.

Optionally the system further comprises at least one turbomachine. The turbomachine may be rotatably coupled with the driveline (or one of the drivelines).

According to an embodiment an engine controller of the turbomachine is adapted to provide at least one signal to the analysis unit and/or one or more vibration sensors is/are arranged to measure and provide signals indicative for amplitude, frequency and/or phase of a vibration to the analysis unit. This allows a combined measurement with increased precision.

According to an aspect, an engine is provided, e.g. for an aircraft, in particular a gas turbine engine, an electrical engine or a hybrid-electrical engine. The engine comprises the system according to any aspect or embodiment described herein. The engine provides propulsion. Therein, said driveline may drive a compressor, fan and/or propeller. It is worth noting that the precise and early detection of vibrations due to gap-dependent forces by the system are particularly beneficial in aircraft engines, because of the very high demands regarding failure safety. As noted before, the engine may be a gas turbine engine, and it may comprise an engine core comprising a turbine, a compressor, and a core shaft connecting the turbine to the compressor; and a fan located upstream of the engine core, the fan comprising a plurality of fan blades; wherein, optionally, an epicyclic gearbox receives an input from the core shaft and outputs drive to the fan so as to drive the fan at a lower rotational speed than the core shaft. It may be provided that the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

According to an aspect, an airplane comprising the system according to any of the aspects or embodiments described herein and/or the engine described herein is provided. This airplane may benefit from reduced vibrations.

Optionally, the airplane comprises two or more drivelines being mounted on the airplane spaced apart from one another. Each driveline may be coupled with one of two or more electrical machines. By this, an excitement of vibrations between the drivelines via an airplane structure may be controlled.

For example, at least one driveline is arranged at one wing (or at one side) of the airplane and at least another driveline is arranged at a different wing (e.g., the respective other side) of the airplane.

According to an aspect, a control system for a hybrid or electric engine, and/or for a system with a plurality of engines is provided, the control system comprising an analysis unit (e.g., the analysis unit in accordance with any embodiment described above or below) adapted to receive signals from an electrical machine having a rotor and a stator rotatable with respect to one another, the rotor being arranged to drive and/or to be driven by a part of a driveline (of the hybrid or electric engine and/or system), the signals being indicative for a motion and/or a force between the rotor and the stator and/or a torque applied on the rotor, wherein the analysis unit is adapted to detect a vibration signature of the rotatable component with respect to the other component based on the signals.

The control system may be further adapted to control at least one device (e.g., of the engine), e.g., the electrical machine, based on the detected vibration signature. Particularly, integer speed ratios of two components of the engine, e.g., shafts, may be avoided by the control system. Beatings may be detected by the control system by means of magnetic pulls in the electrical machine. A trend analysis of characteristic frequencies may be performed for an early detection of gap-dependent forces. Phase differences of two or more shafts may be monitored. The electrical machine may be used to actively damp and/or detune vibrations.

According to an aspect, a method for detection of vibration at a driveline including a rotatable component rotatable about a rotational axis relative to another component is provided, wherein a fluid is arranged in a clearance between the rotatable component and the other component, wherein a rotor of an electrical machine is arranged to drive and/or to be driven by the driveline, the method comprising the steps of: providing, by means of the electrical machine, signals indicative for a property of a motion and/or a force between the rotor and the stator and/or a torque applied on the rotor; and determining, by an analysis unit receiving the provided signals, a vibration signature of the rotatable component with respect to the other component based on the signals. The method may be adapted in accordance with the system of any aspect or embodiment described herein, and it may use the system.

According to an aspect, a method for detection of vibration at a driveline including a rotatable component rotatable about a rotational axis relative to another component is provided, wherein a fluid is arranged in a clearance between the rotatable component and the other component, the method comprising the steps of: providing, by means of a sensor, signals indicative for a motion and/or of a force between two components and/or a torque applied on one or more component(s) of the driveline at different points in time; determining, by an analysis unit receiving the signals, a property of a vibration signature within a predetermined frequency range based on the signals at the different points in time; and, optionally, generating a command based on a comparison of the property of the vibration signature with a predetermined threshold. The method may be adapted in accordance with the system of any aspect or embodiment described herein, and it may use the system.

According to an aspect, a method is provided for detection of vibration at a driveline including a rotatable component rotatable about a rotational axis relative to another component, wherein a rotor of an electrical machine is arranged to drive and/or to be driven by a part of the driveline, the method comprising the steps of: providing, by means of the electrical machine, signals indicative for a motion and/or a force between the rotor and the stator and/or a torque applied on the rotor; and detecting, by an analysis unit receiving the provided signals, a vibration signature of the rotatable component with respect to the other component based on the signals.

According to an aspect, a method is provided for detection of vibration at two or more drivelines, each including a rotatable component rotatable about a rotational axis relative to another component, wherein a rotor of one of two or more electrical machines is arranged to drive and/or to be driven by a part of a respective one of the drivelines, the method comprising the steps of: providing, by means of each of the electrical machines, signals indicative for a motion and/or a force between the respective rotor and the stator and/or a torque applied on the respective rotor; and detecting, by an analysis unit receiving the provided signals, a vibration signature of each of the rotatable components with respect to the respective other component based on the signals.

The method according to any aspect or embodiment described above may be adapted in accordance with the system of any aspect or embodiment and/or in accordance individual feature thereof.

As noted elsewhere herein, the present disclosure relates to a gas turbine engine. Such a gas turbine engine may comprise an engine core comprising a turbine, a combustor, a compressor, and a core shaft operatively connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

BRIEF DESCRIPTION OF THE DRAWINGS

Embodiments will now be described by way of example only, with reference to the schematic Figures, in which.

DETAILED DESCRIPTION

Figure 1:
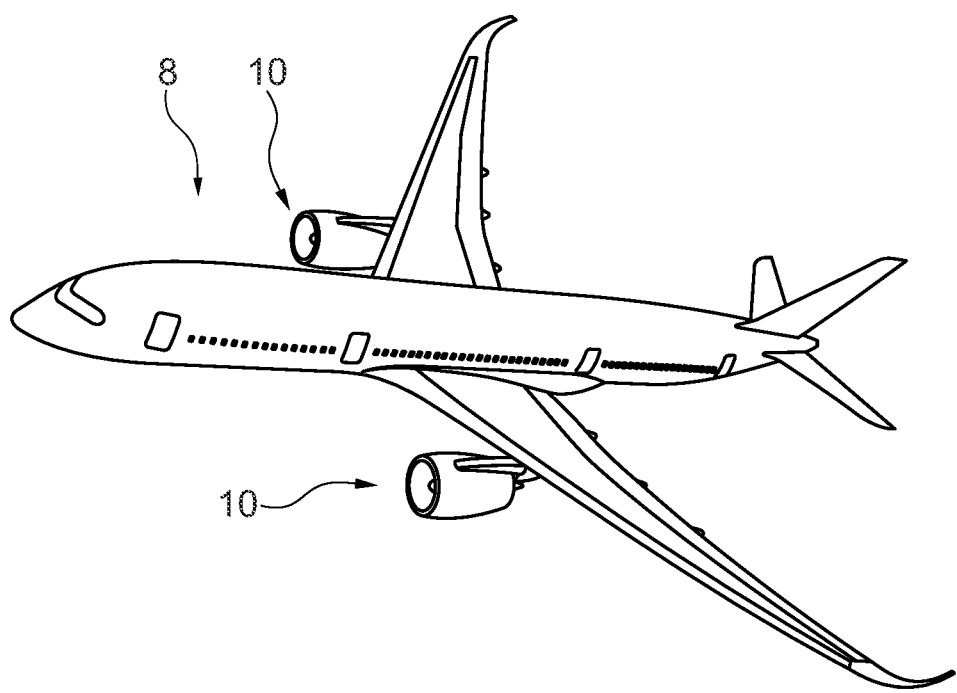
FIG. 1 is an aircraft having a plurality of gas turbine engines.

FIG. 1 shows an aircraft 8 in the form of a passenger aircraft. Aircraft 8 comprises several (i.e., two) gas turbine engines 10 in accordance with FIGS. 2 and 3, and, optionally, an APU.

Figure 2:
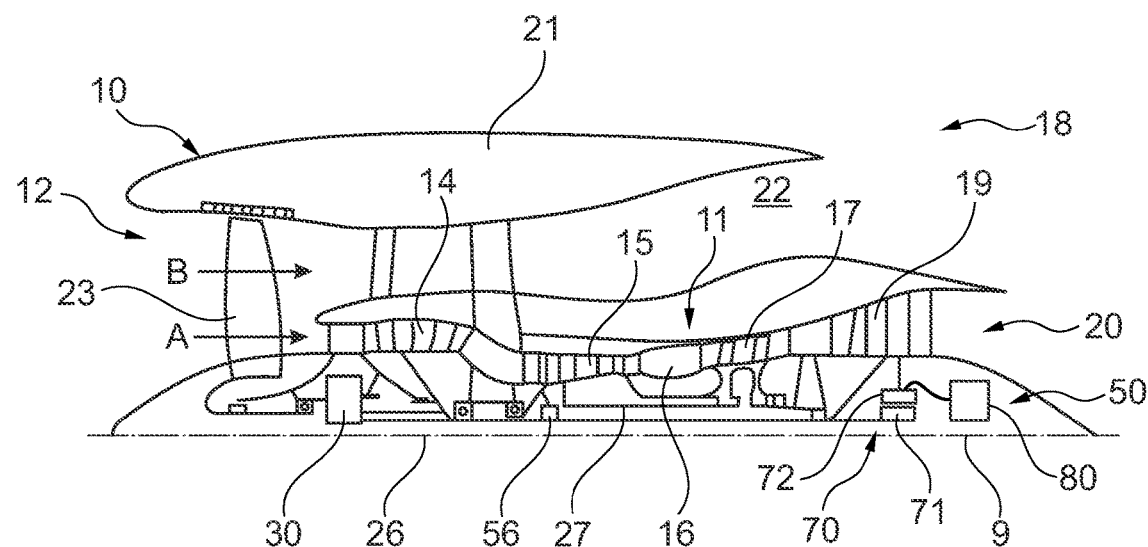
FIG. 2 is a sectional side view of a gas turbine engine.

FIG. 2 illustrates a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 3:
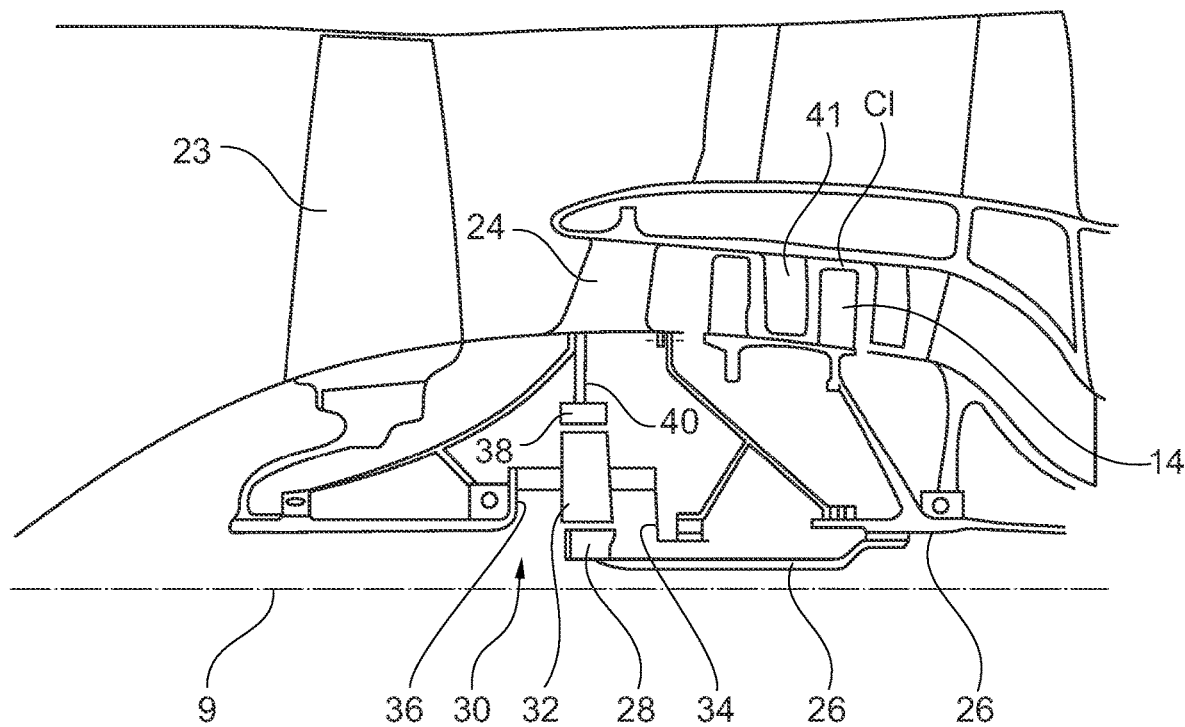
FIG. 3 is a close up sectional side view of an upstream portion of a gas turbine engine.

An exemplary arrangement for a geared fan gas turbine engine 10 is shown in FIG. 3. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 4:
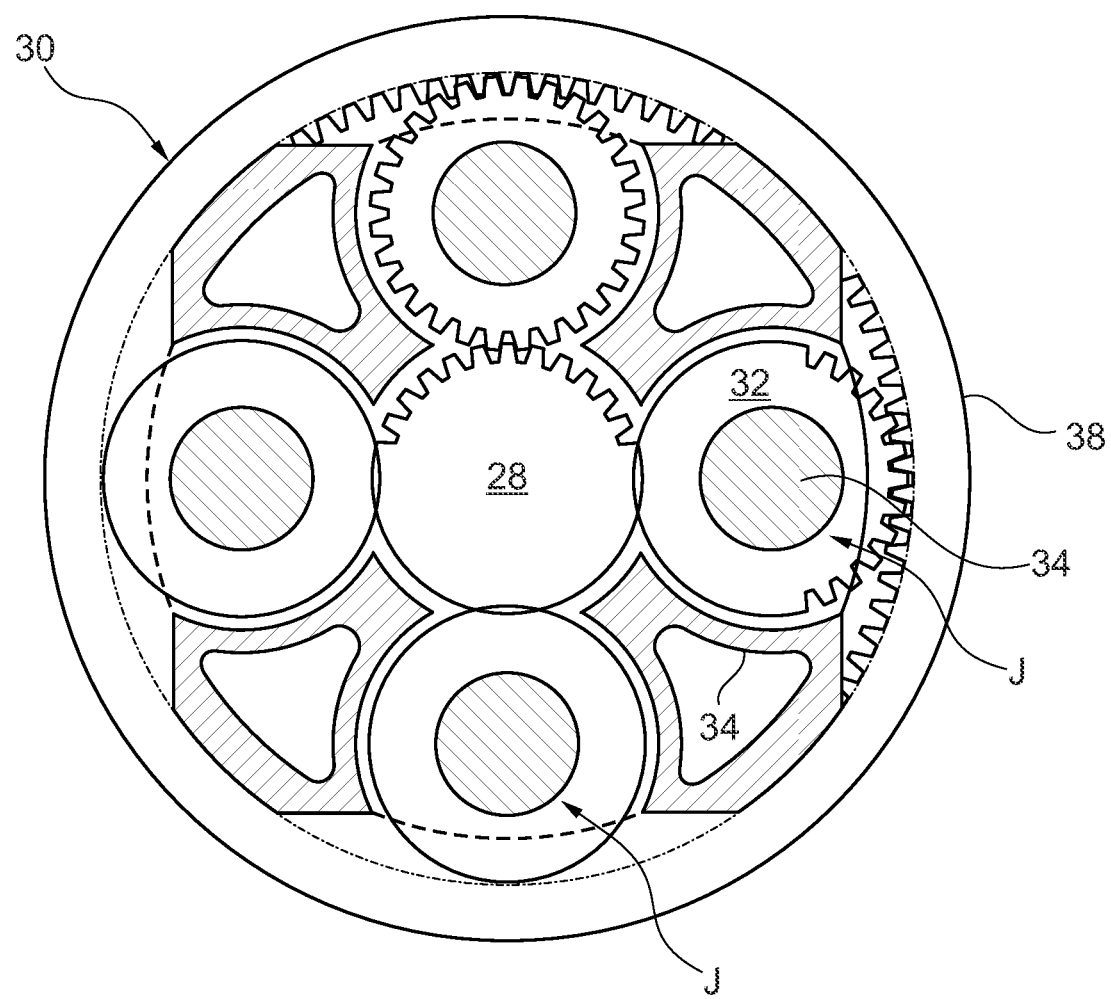
FIG. 4 is a partially cut-away view of a gearbox for a gas turbine engine.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

Each planet gear 32 is a rotatable component, and each pin of the planet carrier 34 serves as another component that forms a journal bearing J with the corresponding planet gear 32.

The epicyclic gearbox 30 illustrated by way of example in FIGS. 3 and 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 3 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. For example, where the gearbox 30 has a star arrangement (described above), the skilled person would readily understand that the arrangement of output and support linkages and bearing locations would typically be different to that shown by way of example in FIG. 3.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 2), and a circumferential direction (perpendicular to the page in the FIG. 2 view). The axial, radial and circumferential directions are mutually perpendicular.

As particularly shown in FIG. 2, the gas turbine engine 10 comprises a system 50 for vibration detection. The system 50 generally comprises at least one pair of a rotatable component and another component rotatable with respect to one another being part of a driveline. In the present example, the gas turbine engine comprises a plurality of such pairs of components, e.g., each of the planet gears 32 that are rotatable relative to the planet carrier 34 and the corresponding pins, the low-pressure compressor 14 and the low-pressure turbine 19, each of which being rotatable with respect to the nacelle 21, and a squeeze film damper 56 as a damping bearing for the shaft, to just name a few. The driveline comprises a plurality of components that are operatively connected such that when one component of the driveline rotates (with respect to a given reference, e.g., the nacelle 21), the other components of the driveline are also rotated (with respect to the reference). Vibrations of one component of the driveline may be propagated to other components of the driveline.

The system 50 further comprises an electrical machine 70. The electrical machine 70 may be regarded as a part of the driveline. In the present example, the electrical machine 70 is an electric motor that can convert electrical energy into motion, and that can also be used as a generator to convert motion into electrical energy. The electrical machine 70 comprises a stator 72 being fixed with respect to the nacelle 21, and a rotor 71. The rotor 71 is rotatable with respect to the stator 72. The rotor 72 is fixed to the shaft 26. Thus, the electrical machine 70 can drive (and be driven by) the low-pressure compressor 14 and the fan 23. It is worth noting that the electrical machine 70 could alternatively be operatively connected to the interconnecting shaft 27 or, e.g., any other shaft of the core engine. Stated more generally, the electrical machine 70 is arranged to drive and/or to be driven by other parts of the driveline.

Further, the electrical machine 70 is adapted to provide signals indicative for a motion and/or a force and/or a torque between the rotor 71 and the stator 72. These signals may be provided with or without pre-processing by an optional control unit of (and/or connected with) the electrical machine 70. Alternatively, the signals may be provided by simply connecting electrical cables to one or more coils of the electrical machine 70. Alternatively or in addition a dedicated vibration sensor adapted to provide signals indicative for a motion and/or a force between two components of the driveline (particularly at different points in time) may be provided.

The system 50 further comprises an analysis unit 80 adapted to receive the signals (from the electrical machine 70 and/or the vibration sensor; there can be one or more electrical machine(s) and/or one or more magnetic bearing (s) distributed in series or parallel connection to one or more rotatable components) and to determine a vibration signature of the rotatable component (e.g., the low-pressure compressor 14 or the planet gear 32 with respect to the other component (e.g., the nacelle 21 or the planet carrier 34) based on the signals, and a property of the vibration signature. Optionally, the analysis unit 80 determines one or more vibration signatures (and, optionally, properties thereof) for one, or more than one rotatable component. To this end, for each rotatable component, the received signals or data derived therefrom may be normalized by the analysis unit 80 by the respective rotational speed of the rotational component. The analysis unit 80 is connected to the electrical machine 70 and/or to the vibration sensor(s) and/or to a control system of or for the electrical machine 70 and/or the vibration sensor(s) so as to receive the signals, e.g., by means of a connection via electrically conductive signal cables or (any kind of) a communicative connection.

The system 50 allows an early detection of an engine alignment degradation by monitoring gap-dependent vibration and unbalanced magnetic forces in the electrical machine, e.g., electrical drive. In particular in aircraft engines, a deterioration of the initial alignment of rotors, for instance caused by changes in radial and axial clearances or in angular misalignments between rotors and between rotors and stators (e.g., fixed relative to the nacelle 21) is known to drive vibrations.

In particular, gap-dependent forces are developed when the gaps between rotors and stators loose the circumferential symmetry and as a result of this, an unbalanced air pressure, oil pressure or magnetic flux exert a resultant force onto the rotors (i.e., rotatable components) that may cause vibrations and instable orbits in turbines, compressors, oil seals, oil bearings, squeeze film dampers and electrical drives (e.g., Alford forces in turbines, Wachel forces in compressors, oil whirl and whip in journal bearings, unbalanced magnetic pull in electrical drives).

Since vibrations generated by the gap-dependent forces appear particularly in frequency ranges that are known and/or can be determined by a baseline measurement, calculation and/or a simulation, and present a high sensitivity to small changes in the rotor alignment, they are good early indicators of loss of alignment and mechanical deterioration, such as an unwanted increase of clearances. Given a certain tip clearance (for turbines and compressors), rotor shaft and housing design, the gap-dependent vibrations appear in frequency ranges that are known or can be determined. Therefore, to detect and monitor frequency and magnitude trends in the gap-dependent vibration that appear as rotor orbits superimposed to the rotor spin represent a good early indicator of a deterioration that causes a loss of rotor alignment in rotating machinery, in particular in an aircraft engine. The analysis unit 80 may store predetermined frequencies (in particular as a function of the corresponding speed of the rotatable component) and search for vibration signatures at these frequencies.

While it is possible to use signals of dedicated vibration sensors for the analysis of the analysis unit 80, e.g., of accelerometers, it is particularly helpful to use signals from an electrical machine in the driveline, e.g., the electrical machine 70, to provide the signals for the analysis. When an electrical machine, e.g., drive, is connected to the rotatable component(s), unbalanced magnetic forces may be induced into the electrical drive as a consequence of asymmetrical gap-dependent forces being generated on the other engine rotatable component(s) because of a loss of alignment somewhere in the driveline. In electrical machines, such asymmetrical gap-dependent orbits and vibrations may be isolated and amplified by dedicated electrical circuits and coils, so that that the electrical machine may work as a vibration sensor highly sensitive to the gap-dependent orbits and vibrations of the other rotatable components. The system 50 may track frequencies, amplitudes and phases of the gap-dependent vibration in electrical or hybrid engines, and in auxiliary power units (APUs) using the capacity of the electrical machine to separate and amplify the movements between rotatable components and the corresponding other components generated by gap-dependent forces acting on the engine driveline.

A further option is to use the electrical machine 70 as a vibration controller. The gap-dependent vibrations of components other than the electrical machine 70 may be actively counteracted by means of the electrical machine 70. To this end, the analysis unit 80 may provide control signals (based on the analysis of the vibration signatures) to the electrical machine 70 to provide voltages and/or currents to the coils based on the control signals. In addition, one or more signals can be sent to the engine controller to actuate other regulations to minimize vibration and/or restore performance levels to nominal (e.g., restore turbine or compressor efficiency changing the operational point).

Figure 5:
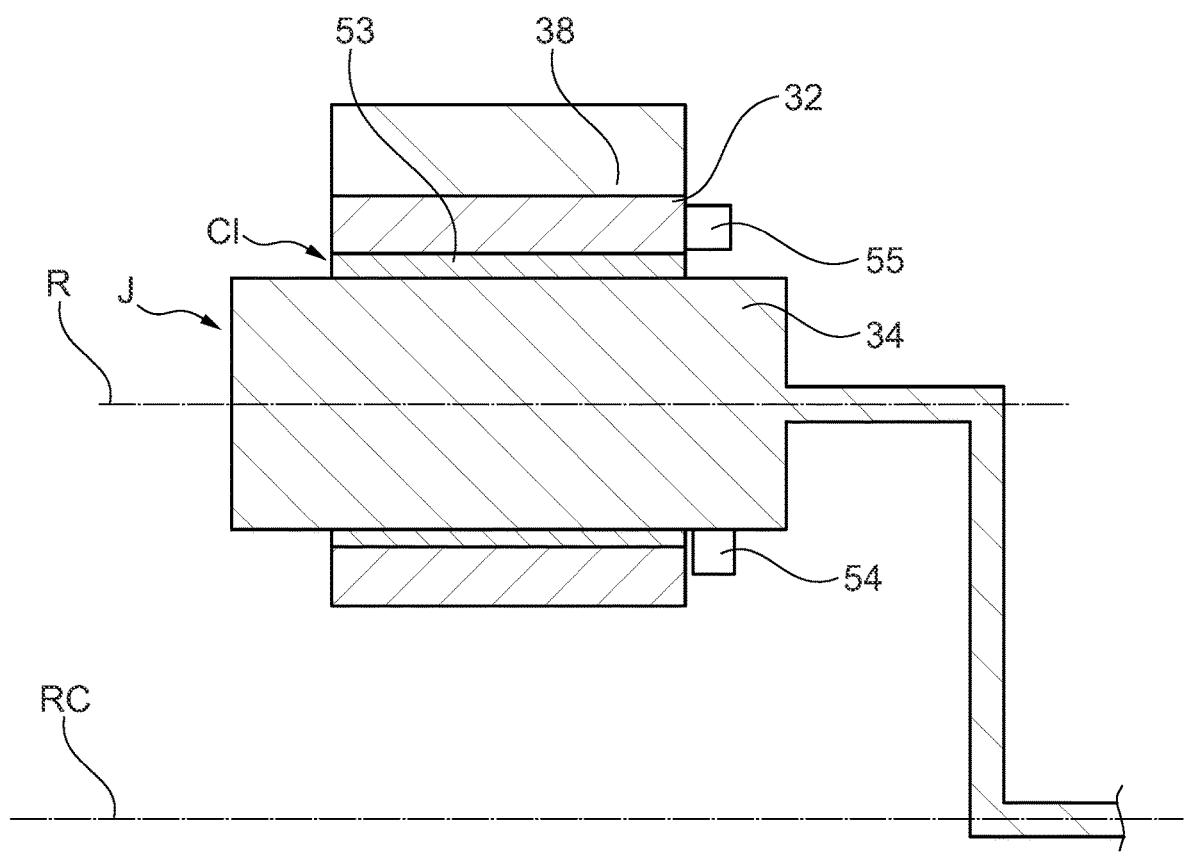
FIG. 5 shows a journal bearing with a rotatable component and another component.

FIG. 5 shows a simplified sketch of a journal bearing J of the gearbox 30. The journal bearing J is formed by planet gear 32 as rotatable component and the planet carrier 34 as other component. The planet gear 32 is arranged so as to be rotatable about a rotational axis R relative to the planet carrier 34.

According to FIG. 5, the planet carrier 34 (more precisely, a pin of the planet carrier 34) is inserted in a receptacle of the planet gear 32. The planet gear 32 thus encompasses the planet carrier 34 pin.

The planet gear 32 has outer teeth that mesh with the ring gear 38. The ring gear 38 extends coaxially around a central axis RC. The planet carrier 34 is mounted rotatable about the central axis RC (e.g., with respect to the ring gear 38).

Between the planet gear 32 and the planet carrier 34 there is a clearance Cl. In other words, the inner diameter of the planet gear 32 receptacle is larger than the outer diameter of the planet carrier 34 pin. The clearance Cl is filled up with a fluid. The fluid acts a lubricant. In the present example, the fluid is an oil 53.

An oil system supplies the oil 53 to the journal bearing J. The oil system comprises an oil tank and an oil pump, or is connected to an oil tank and/or an oil pump. The oil system is generally adapted to adjust at least one property of the oil 53 in the clearance Cl, in particular the pressure and, optionally, the temperature of the oil 53 in the clearance Cl. For this purpose, at least one valve, more precisely, a servo valve, may be adjustable to control the pressure of the oil 53 in the clearance Cl, but also other means are conceivable for this purpose. The oil system may further comprise an oil cooler which is adjustable to control the temperature of the oil 53 in the clearance Cl.

The journal bearing J further comprises a speed sensor 54 as a means to determine the rotational speed of the planet gear 32 relative to the planet carrier 34 (this may be provided to the analysis unit 80), and, in this example, at least one vibration sensor 55 to measure a vibration of the planet gear 32. The vibration (e.g., of an orbiting motion) of the planet gear 32 can be measured by one or more sensor(s) grounded (mounted on a fixed frame) or by one or more sensors rotating with the planet gear 32 (e.g., via a telemetry system). Alternatively or in addition, the at least one vibration sensor 55 may be or comprise at least one accelerometer or a non-contact sensor to measure vibration of rotating parts. The one or more accelerometers may, e.g., be mounted on the planet carrier 34.

Gap-dependent forces may occur in the clearance Cl of the journal bearing J, and may lead to strong vibrations due to instabilities (e.g., oil whirl or whip) of the oil film in the clearance Cl. Correspondingly, also other elements in gas turbine engines and more generally, in rotating machinery can exhibit similar effects, for example squeeze film dampers, as will be described in more detail with reference to FIGS. 6 and 7. Also between the blade tips of the low-pressure compressor 14 (and correspondingly for other stages) and the surrounding casing of the nacelle 21 there is a clearance Cl, see FIG. 3. This clearance is also filled with a fluid, in this case air. Also the air in the clearance Cl at the blade tips may become unstable in certain operating conditions what can result in gap-dependent forces. These forces are often referred to as Wachel forces in compressors. Similarly, corresponding forces are referred to as Alford forces in the case of turbines. This will be described further below with reference to FIG. 8 in an example of a turbine stage.

Figure 6:
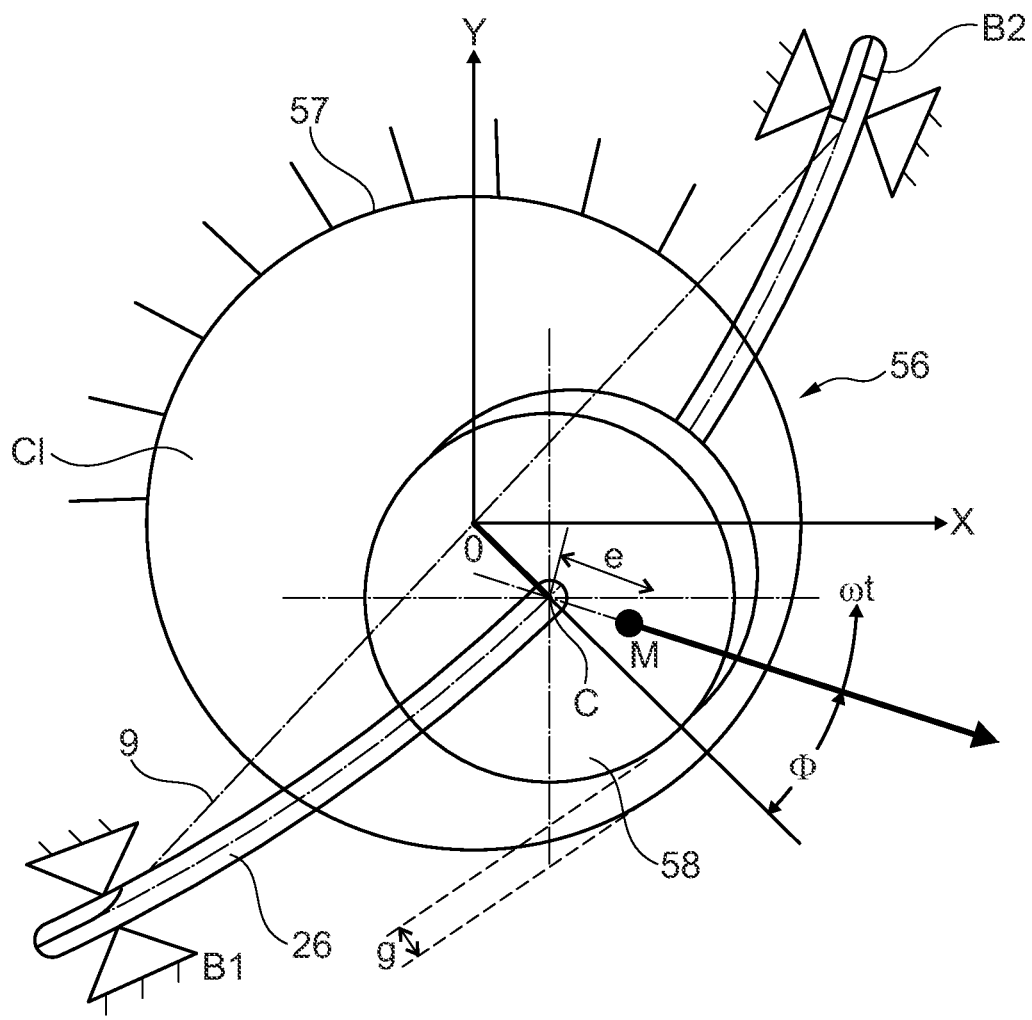
FIGS. 6 and 7 show a squeeze film damper of the gas turbine engine.

FIG. 6 shows the squeeze film damper 56. Squeeze film dampers are lubricated elements providing viscous damping in mechanical systems. Here, the squeeze film damper 56 is mounted at the shaft 26 of the gas turbine engine 10, as one of many possible applications. The shaft 26 is rotatably mounted at bearings, wherein FIG. 6 schematically shows two bearings B1, B2 by way of example. The squeeze film damper 56 is arranged between the bearings B1, B2, as an example. In the figure, the squeeze film damper 56 is shown enlarged for illustration.

The squeeze film damper 56 comprises a housing 57 and a rotor 58. The housing 57 is fixed, e.g., with respect to the nacelle 21. The rotor 58 is rotatably arranged in the housing 57 and has a geometrical center C. The housing 57 is aligned with the axis of rotation of the shaft 26 which in the present example is the principal rotational axis 9. This is indicated in FIG. 6 with the origin 0 of coordinates x, y, which is the location of the center of the housing 57. In a balanced, symmetric state the shaft 26 is aligned with the principle rotational axis 9 (and extends through the origin 0), however, due to asymmetric forces, the shaft 26 may be bent, as shown in an exaggerated manner in FIG. 6. Thus, center C of rotor 58 is displaced from origin 0 (while in a balanced state, center C of rotor 58 would be at the origin 0. Thus, the clearance Cl around the rotor 58 between the outer surface of the rotor 58 and the inner surface of the housing 57 is no longer symmetric, but asymmetric. A smallest gap g having the minimal width is indicated in FIG. 6. The asymmetric gap width may lead to strong vibrations, e.g., by generating fluid (e.g., oil) film whirl or whip.

There are different possible reasons that may lead to an asymmetric arrangement of the rotor 58, one of which being a center of gravity M of the rotor 58 (and/or of the shaft 26) which is radially offset from the geometric center C. In FIG. 6 this is indicated by an eccentricity e of the rotor 58 center of gravity M. A rotation (with speed ω) of the rotor 58 in the housing 57 leads to a centrifugal force indicated with an arrow in FIG. 6 and being oriented at an angle Φ relative to the smallest gap g location with respect to the geometric center C. Other possible reasons are vibrations from other components acting on the squeeze film damper 56, a tilting of the shaft 26, and so forth.

Figure 7:
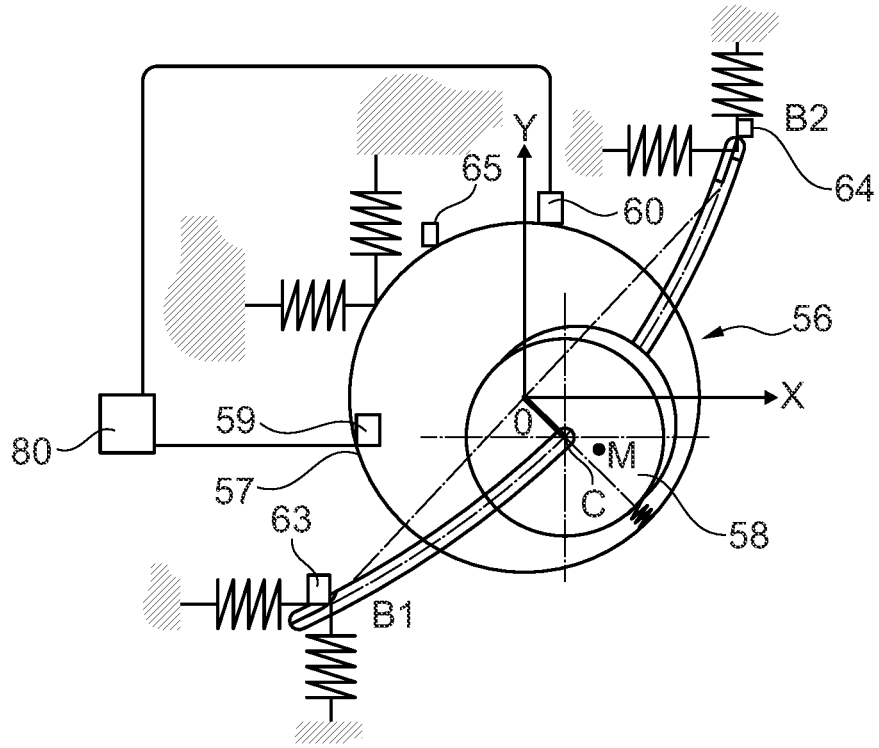

FIG. 7 shows the squeeze film damper 56 of FIG. 6, wherein springs are drawn for illustration to show that the bearings B1, B2, the mounting of the housing 57 and the oil film have elastic properties that influence the dynamic behavior of the squeeze film damper 56. Measurements and/or simulations may be performed to determine the dynamic behavior (e.g., the frequency spectrum, in particular at various different rotational speeds) of the squeeze film damper 56. The results thereof may be used to determine baseline thresholds for comparison in a later monitoring of the squeeze film damper 56 in use.

Further, FIG. 7 shows two possible arrangements of vibration sensors 59, 60, 63. A vibration sensor 59 may be mounted on the inner side of the housing 57 and/or a vibration sensor 60 may be mounted on the outer side of the housing 57 and/or a vibration sensor 63 may be mounted at a bearing B1, B2. The sensor 59, 60, 63 or the sensors 59, 60, 63 is/are connected to an analysis unit 80 such that the analysis unit 80 may receive signals therefrom. Optionally, the analysis unit 80 is the analysis unit 80 shown in FIG. 2.

Figure 8:
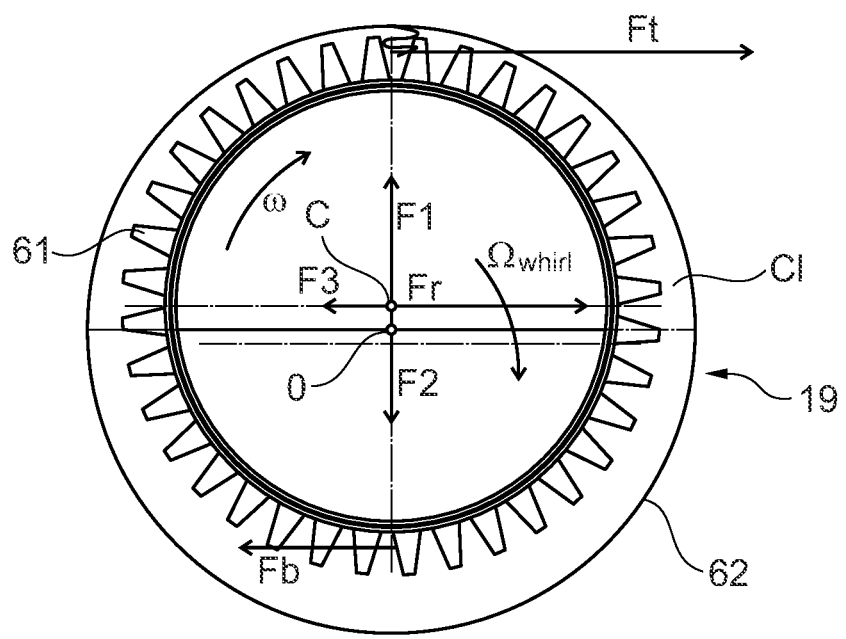
FIG. 8 shows a turbine stage of the gas turbine engine.

FIG. 8 illustrates a turbine stage of the low-pressure turbine 19 having a plurality of blades 61. The blades 61 have outer tips and are surrounded by a casing 62 (fixed to the nacelle 21). Between the blade 61 tips and the casing 62 there is a clearance Cl. However, due to imbalances, e.g. an eccentricity of the shaft 26 or turbine 19 mass from the geometric center C, or other sources of imbalances, the geometric center C of the turbine stage is offset from the origin 0 which is the geometric center of the casing 62. Thus, the blade 61 tip clearance Cl is unequal for the different blades 61.

However, blades 61 with a smaller tip clearance Cl are more efficient than those with a large clearance Cl. Thus, more work is extracted by the blades 61 with smaller tip clearance Cl, and larger force Ft acts on the blades 61 with a smaller tip clearance Cl, while a smaller force Fb acts on the blades 61 with a larger tip clearance Cl. The resultant side force Fr, which is called the Alford force, drives the turbine stage (more generally: the rotor) in the direction of rotation what may lead to whirling. Without sufficient damping, such forces could amplify the displacement of the shaft 26.

FIG. 8 further depicts as F1 the centrifugal force acting on the turbine stage, as F2 the elastic restoring force and as F3 an external damping force.

Figure 9:
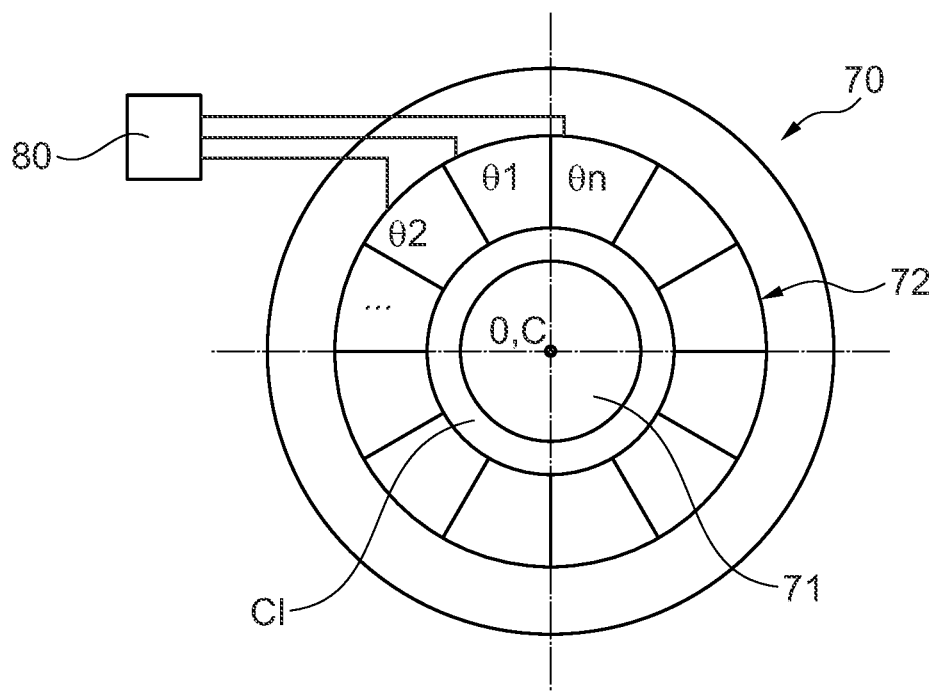
FIGS. 9 and 10 show an electrical machine.
Figure 10:
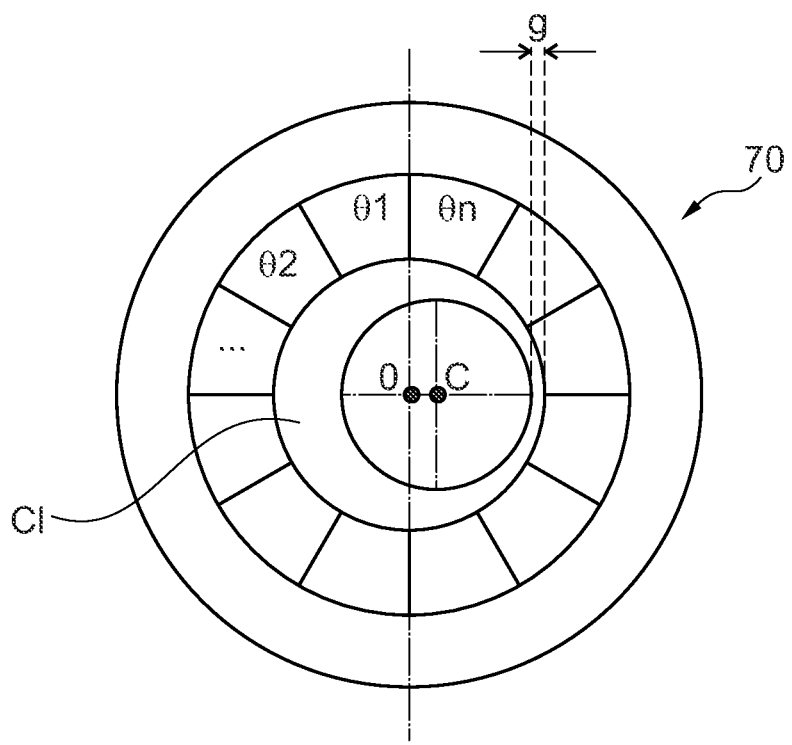

FIGS. 9 and 10 show the electric machine 70 with the stator 72 and the rotor 71. While FIG. 9 shows the rotor 71 with its geometric center C coaxial with the geometric stator center 0, FIG. 10 shows an eccentric arrangement. The clearance Cl between the rotor 71 and the stator 72 is non-uniform in FIG. 10, and the smallest gap g is indicated again.

The stator 72 has a plurality of coils θ1-θN to drive the rotor 71 (that may have permanent or electric magnets).

Unbalanced magnetic pull is usually associated with non-uniform induction due to winding faults or rotor eccentricity conditions. Due to the non-uniform clearance Cl, the magnetic flux in the air gap is also non-uniform and this can be measured by the analysis unit 80 that may be connected to the coils θ1-θn and/or to a control system of the electric machine 70 so as to receive signals therefrom. For example, magnetic induction in the coils θ1-θn may be measured, e.g., by measuring voltages and/or currents at the coils θ1-θn. For example, pairs of opposing coils θ1-θn may be compared.

Thus, the electric machine 70 can detect an unbalance of the rotor 71. However, since the electric machine 70 is operatively connected to other parts of the driveline of the engine 10 core shown in FIG. 2, it is also sensitive to unbalances from rotatable components of the driveline. Thus, the electrical machine 70 can be used as a vibration sensor. Since it may directly sense vibrations in the driveline, rather than by means of external sensors, a particularly high precision is possible without the need of any further sensors. To this end, the electrical machine 70 may provide signals indicative for the unbalanced magnetic pull to the analysis unit 80, or it may pre-process unbalanced magnetic pull signals and provide processed signals, e.g. frequency spectra to the analysis unit 80.

Figure 11:
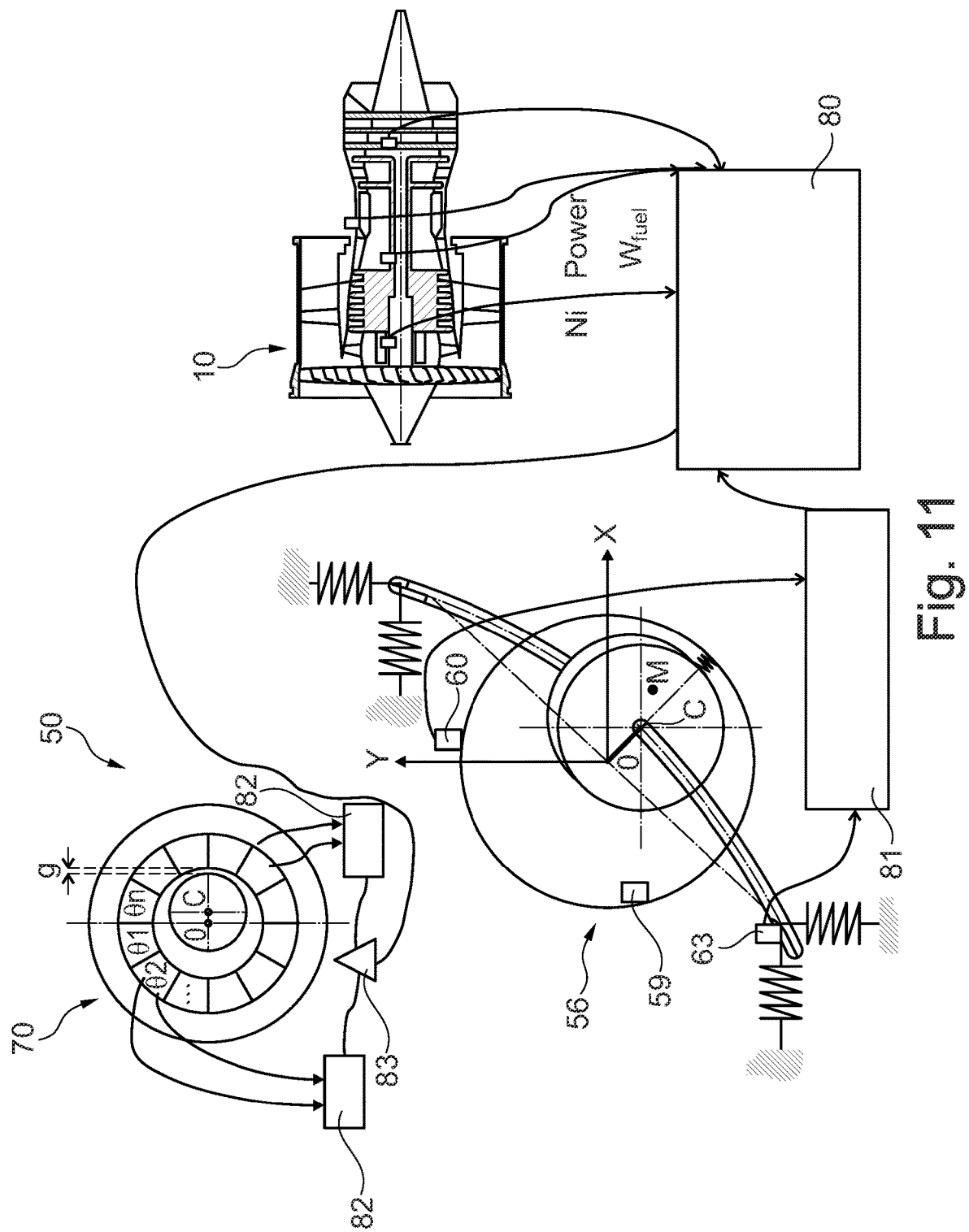
FIG. 11 shows a system of the gas turbine engine for vibration detection.

FIG. 11 shows the various components of the exemplary system 50. Signal acquisition units 82 receive signals from the coils θ1-θn of the electrical machine 70 and, optionally, pre-process these signals. The signals of the coils θ1-θn are then provided to a signal concentrator 83 which provides these received signals, or provides signals determined based on the received signals, to the analysis unit 80. Optionally, signal acquisition units 82 and/or signal concentrator 83 are included in analysis unit 80. Further, optionally, also vibration sensor 59, 60, 63 signals are provided. In the present example these signals are received by a conditioning unit that performs conditioning on the sensor signals and provides conditioned signals to the analysis unit 80. In other examples, the analysis unit 80 directly receives signals from one or more vibration sensors 59, 60, 63. Further, the analysis unit 80 receives other data from the gas turbine engine 10, from sensors and/or a control system thereof, e.g., rotational speed of the shaft 26 or of the shafts 26, 27, power, fuel consumption, one or more temperatures, one or more pressures and/or other data.

It is worth noting that the analysis unit 80 may be one single device, or it may comprise a plurality of communicatively coupled devices that may be displaced from one another.

In the electrical machine 70 the electrical effects that are generated by a shaft movement induced by gap-dependent forces can be amplified to provide a gauge function that may be embedded within the drive itself, and that can be tuned to provide a highly sensitive measure of the gap variation of other rotatable components. It is worth noting that gap variations that generate gap-dependent vibrations are directly connected to the shaft clearances in the moment in which the measure takes place. This allows an optimized early detection of a loss of alignment or deterioration in the engine driveline. Detecting and monitoring gap-dependent vibrations and compare their trends with nominal baseline vibration levels (from look-up tables, a pass-off test and/or FEM simulations) by means of the analysis unit 80 can keep under control a progressive deterioration of a broad range of mechanical wear or damage resulting in a loss of the initial rotor alignment. As an example, after the engine 10 assembly, the positions of the engine 10 rotatable components, i.e., the engine alignment, is determined (by measurement and/or by determination based on the design, the manufacturing tolerances and, optionally, balancing and alignment procedures).

The analysis unit 80 analyzes the received signals at different points in time. In the present example, at each of a plurality of points in time, the analysis unit 80 extracts a frequency spectrum from the signals obtained from the electrical machine 70 and/or from the vibration sensors 59, 60, 63. Further, the analysis unit 80 normalizes the respective frequency spectrum by rotational speed of the rotatable component 14, 19, 32, 58 that is to be monitored. Optionally, this step is performed for a plurality of different rotatable components 14, 19, 32, 58, when their rotational speeds are different. Note that the rotational speed(s) of the rotatable component(s) may change between the different points in time t1-t5.

FIG. 12A to 12E show corresponding normalized frequency spectra for the example of the rotor 58 of the squeeze film damper 56 at different points in time t1 to t5. Therein, the diagrams show the amplitudes versus the frequency in engine orders, i.e., normalizes by the shaft 26 speed. Thus, a peak at engine order 1 corresponds to a vibration that is synchronous with the shaft 26 rotational speed.

The analysis unit 80 searches for signatures in the spectra of the received signals. Particularly, the analysis unit 80 searches for signatures in a predetermined frequency range of 0.1 to 0.5 engine orders. For example, the signature in the spectra may be one or more peaks. Thus, the analysis unit 80 may use a peak finder to find peaks in the spectra, e.g., local or global maxima. Also an analysis of frequency combinations from different shafts, such as beating frequencies and sidebands, can be carried out for cross shaft vibration monitoring.

Figure 12A:
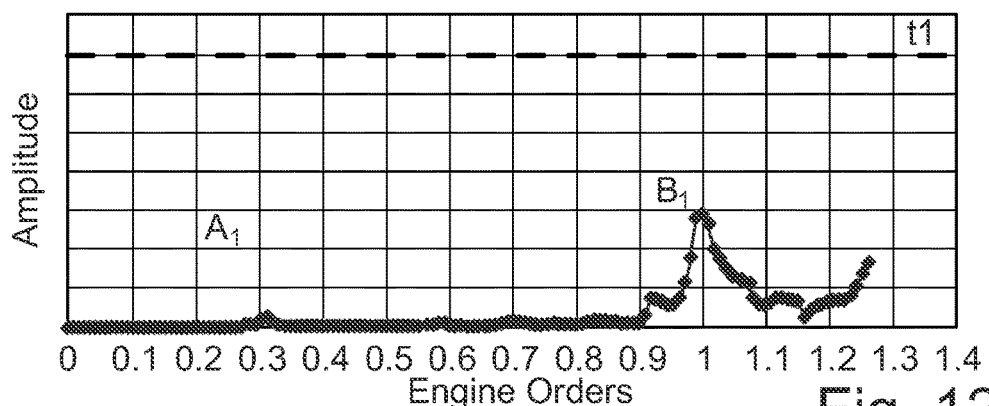
FIG. 12A to 12E show vibration spectra at different points in time.

FIG. 12A shows a reference spectrum at time t1 denoting a signature A1 in the range of 0.1 to 0.5 engine orders. This vibration peak can represent the amplitude in one direction of a sub-synchronous orbit generated by a gap-dependent force that is appearing because of a loss of alignment in the rotor shaft. A1 is at about 0.32 engine orders. Further, signature B1 is denoted at engine order 1. The amplitude of the first engine order may be used to detect a loss of alignment and/or augment of eccentricity. The reference spectrum of the point in time t1 may serve as a baseline. For example, the reference spectrum has been acquired after production of the gas turbine engine 10. A dashed horizontal line indicates an alarm threshold active on the magnitude of the first engine order. When the vibration at a frequency exceeds the threshold an alarm is triggered to initiate counter measures.

Figure 12B:
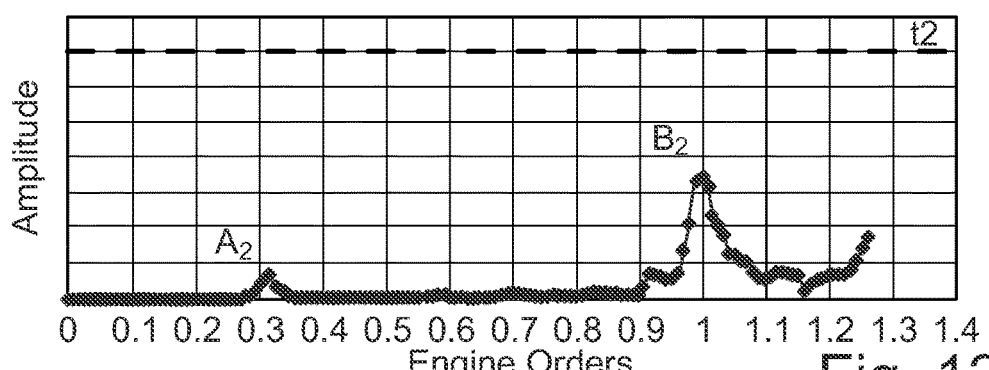

Comparing the spectrum obtained at time t2 shown in FIG. 12B to the reference spectrum at time t1 shown in FIG. 12A it can be seen that the A signature (indicated as A2) has an increased amplitude. The analysis unit 80 determines at least one property, in the present example several properties, of the signature. Here, the analysis unit 80 determines the properties of all signatures in the predetermined range of 0.1 to 0.5 engine orders. In this example, the analysis unit 80 determines amplitude and the frequency as properties of the signatures. Between A1 and A2, the amplitude slightly increased and the frequency remained substantially unchanged. Also the B signature shows a slightly increased amplitude, compare B1 and B2.

Figure 12C:
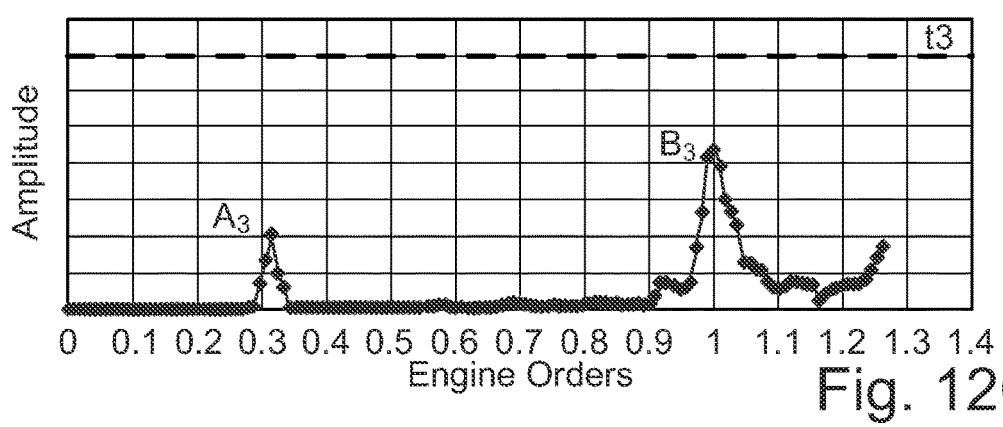

However, at time t3 shown in FIG. 12C, the A signature has an amplitude that strongly increased compared to A1, and has a much larger relative increase compared to B3/B1.

Figure 12D:
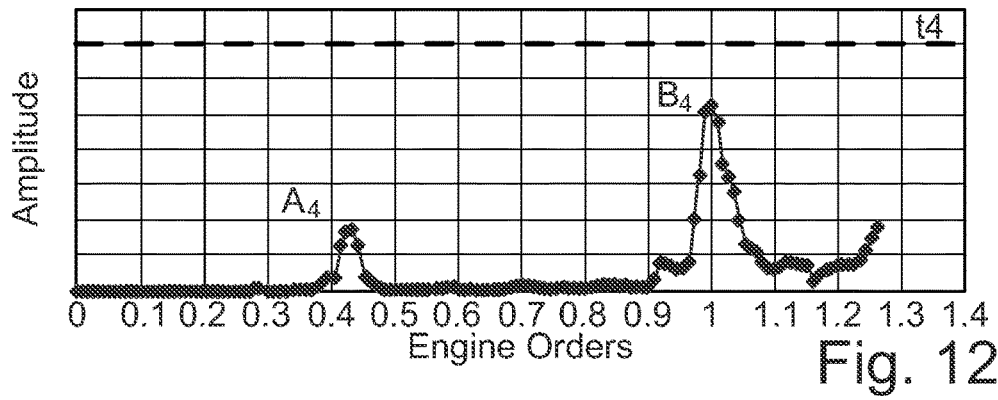

At time t4 shown in FIG. 12D, the amplitude of the A signature decreased compared to time t3, compare A4 to A3, and the B signature has a further increased amplitude, compare B4 to B3. In addition, the A signature orbit has a changed frequency, note A4 at about 0.43 engine orders due to a stiffer reaction of the fluid trapped in a smaller gap onto the rotor(s). The smaller gap gives higher pressure that in turn gives a stiffer reaction against rotor vibration (e.g., in radial direction, such as a precession orbit). In turbine rotors and compressors this jump in the sub-synchronous orbit frequency may indicate that a failure condition is approaching. It is worth noting that the amplitude of B4 is still clearly below the alarm threshold. Gap-dependent vibrations commonly have frequencies that change with the gap width, usually showing a frequency increase as the gap diminishes. The reason for this is mainly the fluid flow being accelerated faster within a narrower gap. An evaluation of the trends of the frequency of a vibration signature versus time may thus provide an early indication of an unwanted change in the engine alignment that may quickly deteriorate. This allows to enable optimized planned maintenance protocols and activate a vibration controller in order to maintain the required level of structural integrity throughout the operative life of the engine and reduce service costs. The analysis unit 80 is adapted to identify, separate and monitor vibrations generated by gap-dependent orbits and/or vibrations. From the amplitude of gap-dependent vibration and/or orbit by means of FEM or a look-up table it is possible to evaluate the loss of alignment for a given design (and vice versa). Further, FEM (finite element method) and/or look-up tables can provide evaluation of the corresponding force by means of calculation (e.g., rig experiment with load cell or non-linear FEM simulation). For this, different types of vibration sensors located on the engine may be used, such as accelerometers, dynamic pressure probes, strain gauges, proximity probes etc., but particularly precise can be an alternative or additional (intrinsic) measurement using the electrical machine 70. The analysis unit 80 may relate the vibrations to the loss of alignment or engine deterioration, particularly by comparison with a baseline within the design limits, for instance obtained at an engine pass-off test. In addition, also detrimental vibration instability trends provoked by the gap-dependent forces themselves may be identified by the analysis unit 80, and avoided during engine operations.

Figure 12E:
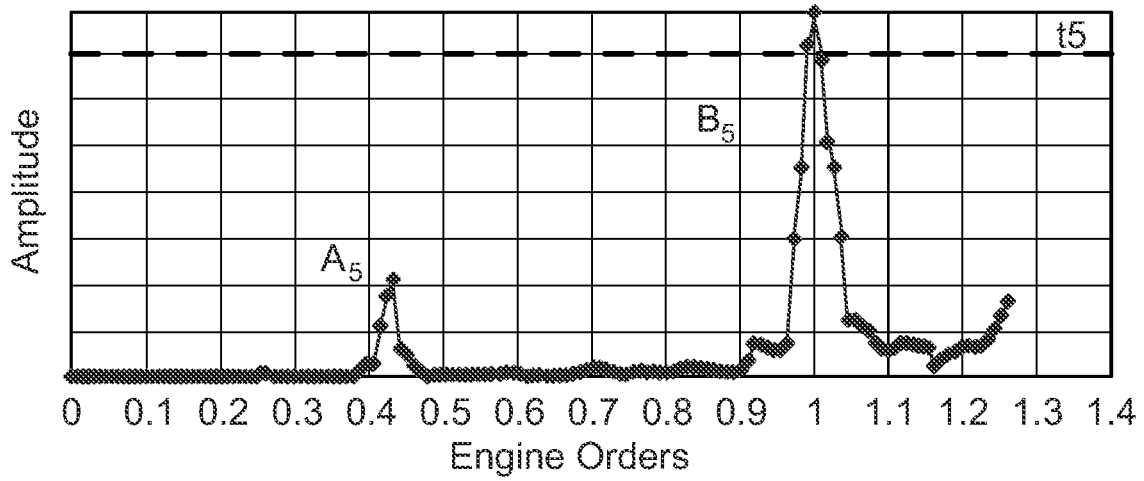

At time t5 shown in FIG. 12E, the A signature has the same frequency as at time t4 and a slightly increased amplitude, compare A5 to A4. However, the B signature now exceeds the alarm threshold. The alarm threshold is set such that under normal conditions an uninterrupted operation is ensured, but amplitudes close to the threshold or even beyond may already result in an increased wear of several parts of the engine, and may also lead to uncomfortable vibrations in the cabin in case of an aircraft engine. The system 50 described herein allows to detect incoming fluid (oil, air, etc.) instabilities even before such large amplitudes actually are built up.

When a fluid in a clearance, such as oil in the journal bearings J or squeeze film damper 56, or the air in the compressor or turbine stages becomes instable, it creates specific changes of the properties of vibration signatures. The analysis unit 80 may further determine the ratio of the amplitudes (or another property) of the A and B signatures at the points in time t1 to t5. The analysis unit 80 may store, e.g., in look-up tables and/or in FEM plots, predetermined changes, thresholds or other values to compare with for signatures, particular for those in the predetermined frequency range of 0.1 to 0.5 engine orders (where gap-dependent forces particularly show). The analysis unit 80 is then adapted to compare extracted properties of signatures with these values to determine whether a gap-dependent vibration sets in and, optionally to provide a command, e.g., to initiate counter measures. For example, a sudden increase of the amplitude and/or a sudden change of the frequency of a signature may be such an indication.

Optionally, and particularly in the case of a gas turbine engine 10 application of the system 50, the analysis unit 80 is adapted to receive and analyze two groups of variables in parallel, wherein each of the groups of variables may be processed in the form of a vector.

The first group (or vector) has a plurality of n variables and may include at least two or all of the following: one or more shaft speeds, one or more temperatures, a fuel intake, variable vane regulations, throttle positions, one or more pressures, one or more torques, a power, a true air speed, an altitude, one or more currents and one or more charge storage levels. The n variables may be chosen in order to define the power regulation condition that may be affected by a malfunctioning of one or more engine components. The first group of variables describes an engine regulation state.

The second group (or vector) has a plurality of j variables, may be based on the received sensor signals, and may include at least two or all of the following: amplitude, frequency and phase of the absolute vibration of the rotatable component as measured in a fixed frame, and/or of relative vibration as measured between two rotatable components. These variables may be measured in a plurality of locations and/or in radial, tangential and axial direction, and at one or more rotatable components of one or more (e.g., parallel) rotor shafts and/or of one or more drivelines (e.g., in the same engine or power plant). The second group of variables describes a rotatable component vibrational state.

It is worth noting that the analysis unit 80 may receive the first and/or second groups of variables, or, more general, receive signals from the sensor(s) on a continuous or on a periodic basis. Further, the analysis unit 80 may analyze the first and/or second groups of variables, or, more general, analyze signals from the sensor(s) in response to the occurrence of predefined trigger events and/or in intervals.

The analysis may comprise a processing of the measured properties of the vibration signatures, and a comparison with baseline ranges (e.g., alarms and/or thresholds which generate different maintenance protocols). The comparison of the measured properties (in particular in the form of a vector) may be performed with a corresponding baseline, e.g., obtained from a look-up table. Optionally, a look-up table used by the analysis unit 80 for comparison with the vibration signature properties (vector) may cross-correlate different parameters, in particular for cases where not all parameters can be measured. Thus, missing parameters can be extrapolated.

Figure 13:
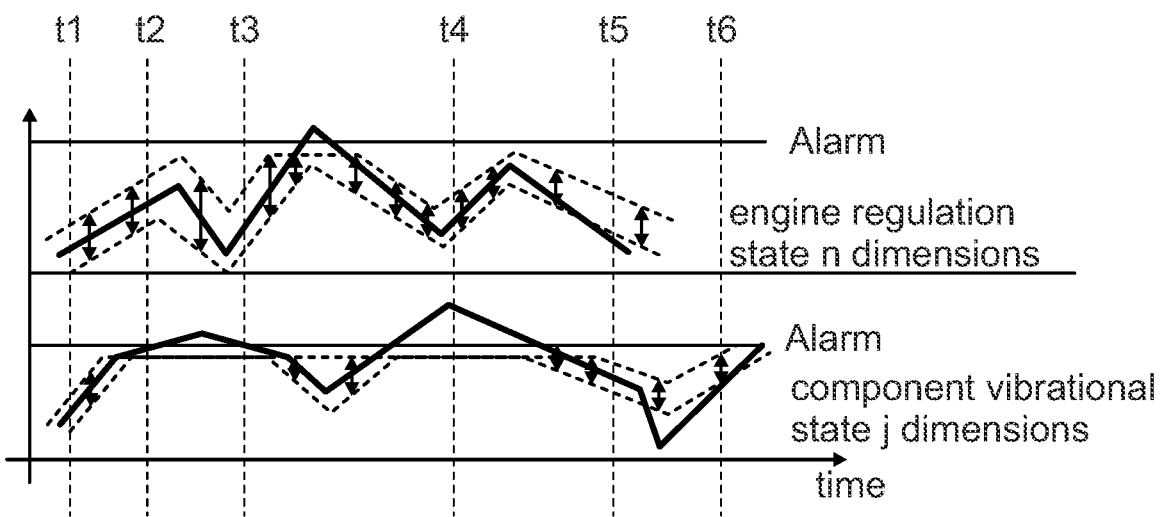
FIG. 13 shows a diagram with determined values and different thresholds and intervals for the values versus time.

FIG. 13 shows a diagram wherein the upper solid line indicates the value of an engine regulation state variable of the first group at various points in time between t1 and t6, and the lower solid line indicates a value of a rotatable component vibrational state variable at the various points in time between t1 and t6. Around both solid lines, an interval is indicated by dashed lines. This intervals define the normal operational status. For example, the interval of the value of the rotatable component vibrational state may depend on the value of value of one or more engine regulation state variables. A value outside of the interval may trigger an alarm and/or maintenance actions, see at t5 for the upper curve, and between t5 and t6 for the lower curve. For both variables a corresponding horizontal line indicates an alarm threshold. An exceedance triggers an alarm, see between t3 and t4 for the upper curve, and between t2 and t3 and at t4 for the lower curve.

For the analysis of the received vibration signals, the analysis unit 80 may be adapted to perform a frequency-domain analysis. In this regard, an FFT may be applied on the received signals from the one or more vibration sensors 55 and/or the electrical machine 70. Therein, the analysis unit 80 may determine whether or not any signals (e.g., above a predefined threshold) are present in the range of 0.1 to 0.5 or 0.45 times the rotational speed of the rotatable component.

Optionally, a time domain trend analysis may be performed on the vibration signal. For example, an increasing amplitude may be determined, or a peakfinder algorithm may be performed to detect critical signals. Alternatively or in addition, an angular domain analysis may be performed on the vibration signal. Alternatively or in addition, a phase analysis may be performed. As an example the analysis unit 80 may determine a change of a phase of the vibration, because a change of the phase, in particular while the speed of the rotatable component is steady, may indicate an onset of a fluid film instability. As an example, the phase may perform an instantaneous change at a resonance which, in turn, may drive a fluid film instability.

In addition to the vibration sensor 55 signals, other parameters of the machine may be analyzed by the control system 56. For example, the machine is a gas turbine engine having one, two or three shafts, each driven by a respective turbine. The rotatable component may be driven by one of the shafts. Speed encoders for speeds of the shafts may provide signals to the analysis unit 80. In this case, a separate speed sensor may be omitted. Further, torquemeters measuring the torque of one or more of the shafts may provide torque signals to the analysis unit 80. Further vibration sensors for the gas turbine engine may also provide signals to the analysis unit 80. An engine power measurement result may be provided to the analysis unit 80. Other engine health parameters may be provided. Particularly, the rotatable component may be a part of the epicyclic gearbox for the fan of the gas turbine engine. A power loss in the gearbox may be determined and also provided as a signal to the analysis unit 80. The analysis unit 80 may receive one, more or all of the above signals. For the signals that the control system receives, additionally baseline condition values may be provided. Further, such baseline values may be provided versus an engine operating condition, such as speed, torque, flight altitude and/or atmospheric conditions. By means of these baseline conditions, the analysis unit 80 may refine its analysis.

The analysis unit 80 may analyze the vibration signals based on shaft-orders related misalignment and sidebands, bearing defect frequencies, blade passing frequencies, integer-speed-generated harmonic cross-shaft vibration, known natural frequencies (for components, modules and/or the whole engine), the gearmesh frequency, harmonics of the rotatable component, electrically generated harmonics, and/or subsynchronous orders related to gap-dependent vibration. The analysis unit 80 may store one or more of the latter for comparison with the received signals.

In general, the analysis unit 80 may determine, based on the determined vibration signature properties, whether or not there is any trend in a gap-dependent vibration. Further, it may determine whether there is any trend in non-subsynchronous vibration. If either is the case (alternatively, if both are the case) an alarm and or maintenance may be triggered by the analysis unit 80.

Optionally, the analysis unit 80 performs a phase analysis, particularly extract a phase lag or phase lead, e.g. between one or more vibration signatures and a fixed reference position on the rotatable component. The phase analysis may be carried out in particular on fluid film (key indicator) frequencies, alternatively or in addition on other harmonic and/or subharmonic frequencies that allow to define the position of the rotor.

Figure 14:
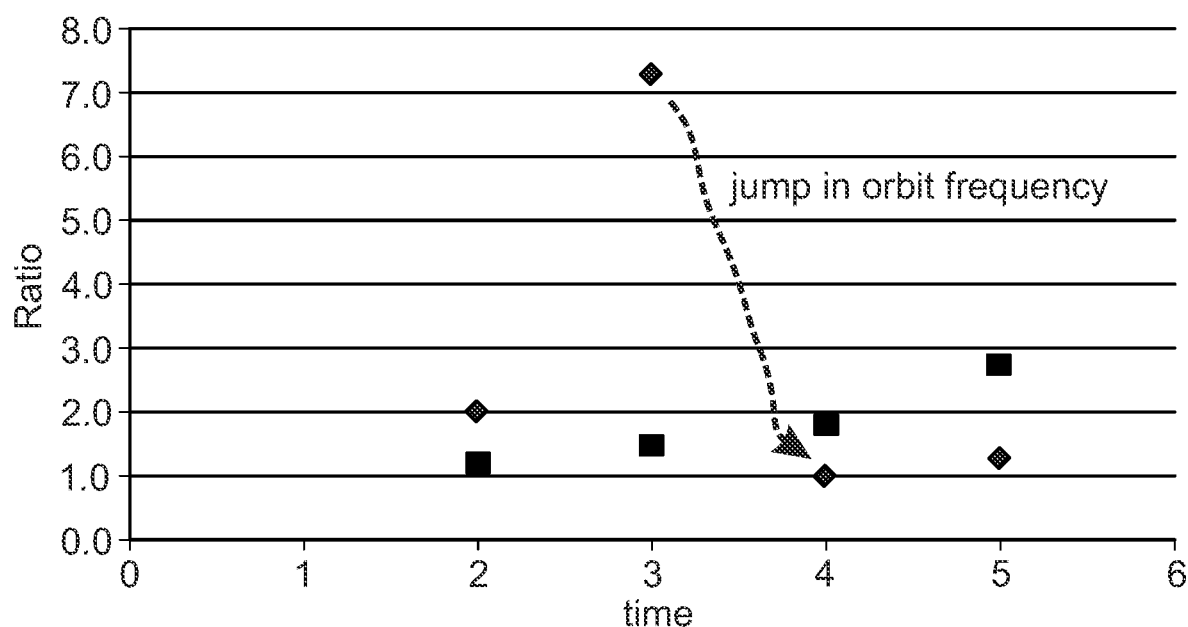
FIG. 14 shows a diagram of amplitude ratios versus time.

FIG. 14 shows ratios of vibration signature properties (here: amplitudes) of vibration signatures at subsequent points in time. The analysis unit 80 may be adapted to determine ratios of properties (e.g., amplitudes) of vibration signatures at subsequent points in time in order to detect a misalignment of a component of the engine (or system 50), and, optionally, to generate a command and provide the command to an active means of the system 50 and/or of another adjustable engine (or in general machine) component.

In FIG. 14, the ratio of the A (diamonds) and B (squares) signature property at a certain point in time over the corresponding value at a preceding point in time is shown, i.e., Ai/A(i−1) and Bi/B(i−1), versus time. In this example, the property is the amplitude as shown in FIG. 12A-12E. The (sudden) increase of the A signature property which is (much) stronger than the increase of the B signature property between the same points in time is detected by the analysis unit 80. Further, the analysis unit 80 detects the change of the frequency of the A signature between times t3 and t4. Based on the latter or based on that in addition to the change (in particular, increase) of the frequency of the A signature there is no substantial change of the amplitude (particularly due to the stiffness of the fluid) of the A signature (and/or that between the same points in time the amplitude of the B signature further increased) the analysis unit 80 may detect an onset on an instability in an early manner. Thus, it can be seen that the orbits and vibrations (sub-synchronous) that are generated by gap-dependent forces are more sensitive to a loss of alignment than the vibration related to rotor misalignment and of unbalance (at 1 engine order and multiple).

Figure 15:
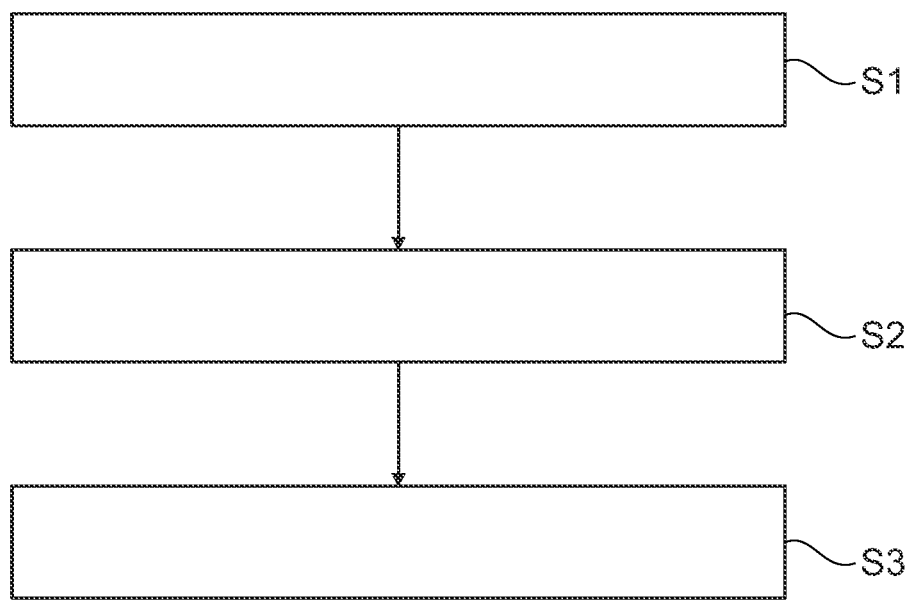
FIG. 15 shows a method for detection of vibration at a driveline.

FIG. 15 shows a method for detection of vibration at a driveline including a rotatable component rotatable about a rotational axis relative to another component, wherein a fluid is arranged in a clearance between the rotatable component and the other component. The method comprises the following steps.

Step S1: providing, by means of a sensor 55, 70, signals indicative for a motion and/or of a force between two components 14, 21, 32, 34 of the driveline at different points in time, wherein an electrical machine 70 being part of the driveline may be used as the sensor, the electrical machine including a rotor arranged to drive and/or to be driven by a part of the driveline.

Step S2: determining, by an analysis unit 80 receiving the provided signals, a vibration signature of the rotatable component 14, 19, 32, 58 with respect to the other component 21, 34, 59 based on the signals.

Step S3: generating a command based on a comparison of the property of the vibration signature with a predetermined threshold.

The method may use the system 50 described herein, and be adapted to perform steps described with reference to the system 50.

Various parameters have an impact on the onset of an unstable operation, particularly speed, but also load, oil viscosity, external vibrations, and a tilting of the rotatable component. When only amplitudes of a vibration of the rotatable component are monitored, in some cases the reaction time may be too slow and, e.g., when the speed is reduced or even stopped, the journal bearing could already be damaged. In addition, amplitudes per se may be not reliable enough for the detection of an oil film instability in some applications. It has turned out, however, that by monitoring specific predefined frequencies, in particular ranges of frequencies of vibrations of the rotatable component, it is possible to detect an onset of a fluid film instability in a very reliable and quick manner.

Figure 16:
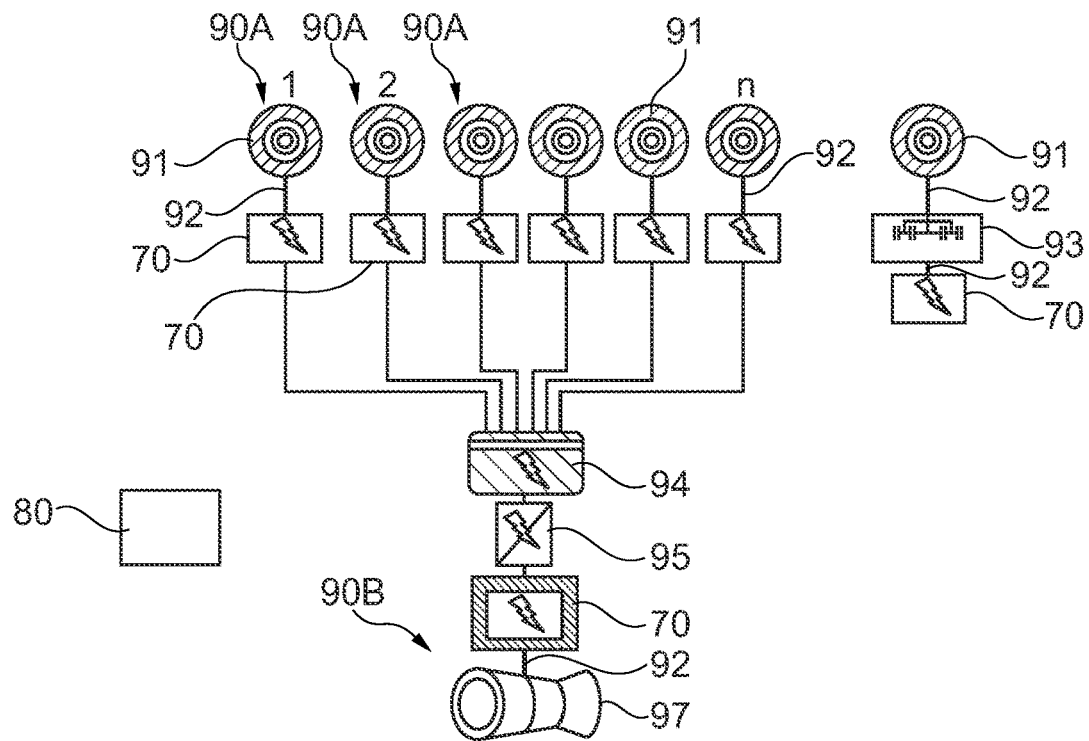
FIGS. 16 to 19 show various systems with a plurality of drivelines and a plurality of electrical machines.

FIG. 16 shows a system including a plurality of drivelines 90A, 90B in a hybrid configuration. At the upper part of the figure a plurality of n drivelines 90A is shown, each of which having a bladed rotor 91 (e.g., a fan or a propeller). Each bladed rotor 91 is coupled with an electrical machine 70 in the form of an electric motor via a shaft 92. Thus, for each driveline 90A the electrical machine 70 drives the bladed rotor 91. The system may be part of an aircraft. Each of the electrical machines 70 is electrically connected to an energy storage 94. The energy storage supplies electrical power to the electrical machines 70 of the drivelines 90A. The electrical storage 94 receives electrical power from power electronics 95 which, in turn receive electrical power from an electrical machine 70 in the form of an electrical generator. This electrical machine 70 is coupled, via a shaft 92, with a turbomachine 97 (or other engine combusting fuel). The turbomachine 97 drives the electrical generator.

It is worth noting that in one or more, e.g., each, of the drivelines 90A, between each electrical machine 70 and the corresponding bladed rotor 91, a gearbox 93 may be arranged so that the electrical machine 70 drives the bladed rotor 91 via the gearbox 93. The gearbox may be designed as described above with reference to FIG. 4.

The analysis unit 80 is communicatively coupled to each of the electrical machines 70 of the drivelines 90A and/or to the electrical machine 70 of the driveline 90B, and receives signals indicative for a motion and/or a force between a rotor and a stator and/or a torque applied on the rotor of the respective electrical machine. The vibration signals may be analyzed by the analysis unit 80, and vibration signatures (e.g., as described above) may be detected based thereon. For example, speed ratios R of the speeds of two of the electrical machine 70 rotors may be determined. Integer ratios of speeds and intervals around integer ratios of speeds may be avoided by controlling the electrical machines 70 of the system by means of the analysis unit 80. In this regard, reference is made to the corresponding description further below. Further, cross-shaft vibrations may be detected and, optionally, disrupted by an according control of one or more of the electrical machines 70, e.g., increasing or decreasing a speed and/or torque of one or more of the electrical machines 70. Further, orbits of the electrical machine 70 rotor precession may be determined using the provided signals.

Figure 17:
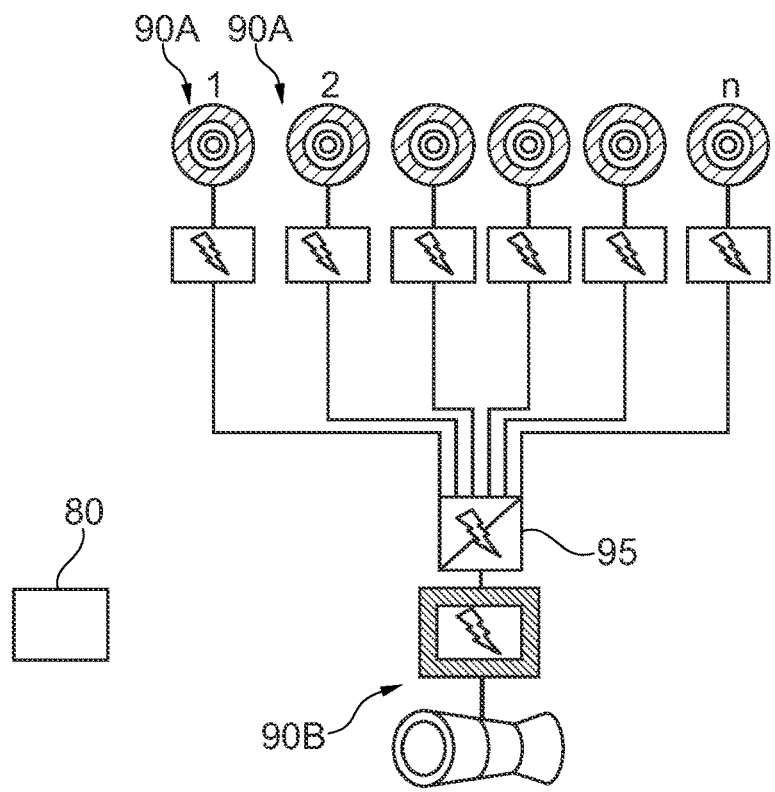

FIG. 17 shows a system with a turbo electric configuration. Therein, a plurality of drivelines 90A as described above is powered (via power electronics 95) by a driveline 90B with an electrical machine 70 in the form of or used as a generator mechanically driven by a turbomachine 97. In contrast to the system in accordance with FIG. 16, the system in accordance with FIG. 17 does not comprise a buffering electrical energy storage 94. Regarding monitoring and control, reference is made to the description of the system in accordance with FIG. 16.

Figure 18:
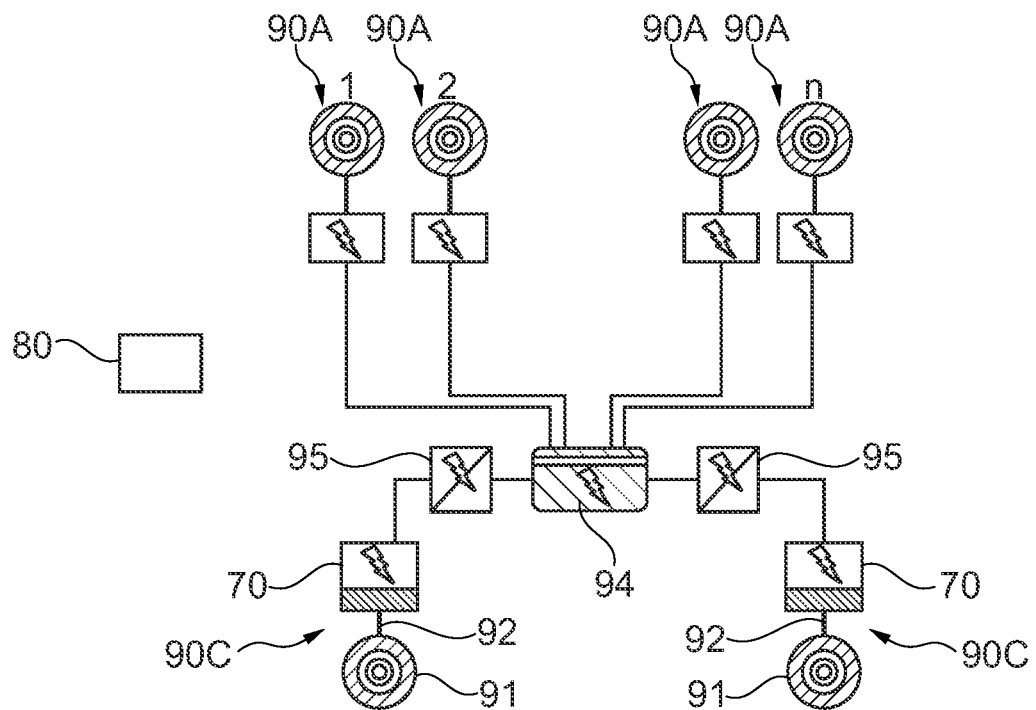

FIG. 18 shows a system with an all-electric configuration, i.e., without any turbomachine or other engine combusting fuel. The system comprises several drivelines 90A with an electrical machine 70 in the form of an electric motor as described above. These drivelines 90A are electrically connected to, and driven by, an energy storage 94. Here, the energy storage 94 is supplied with electrical power by drivelines 90C. These drivelines 90C comprise a bladed rotor 91, e.g., a fan or propeller, adapted for driving, and be driven by, an electrical machine 70 in the form of a motor-generator.

For an airplane with the system in accordance with FIG. 18, the energy storage may be charged before take-off. All bladed rotors 91 may be used for propulsion. During flight (or on the ground) the drivelines 90C may be used for charging the energy storage 94. In this system all potential cross-shaft vibration excitation is effected via the airplane body. For example, the drivelines 90A, 90C are all displaced with respect to one another.

Figure 19:
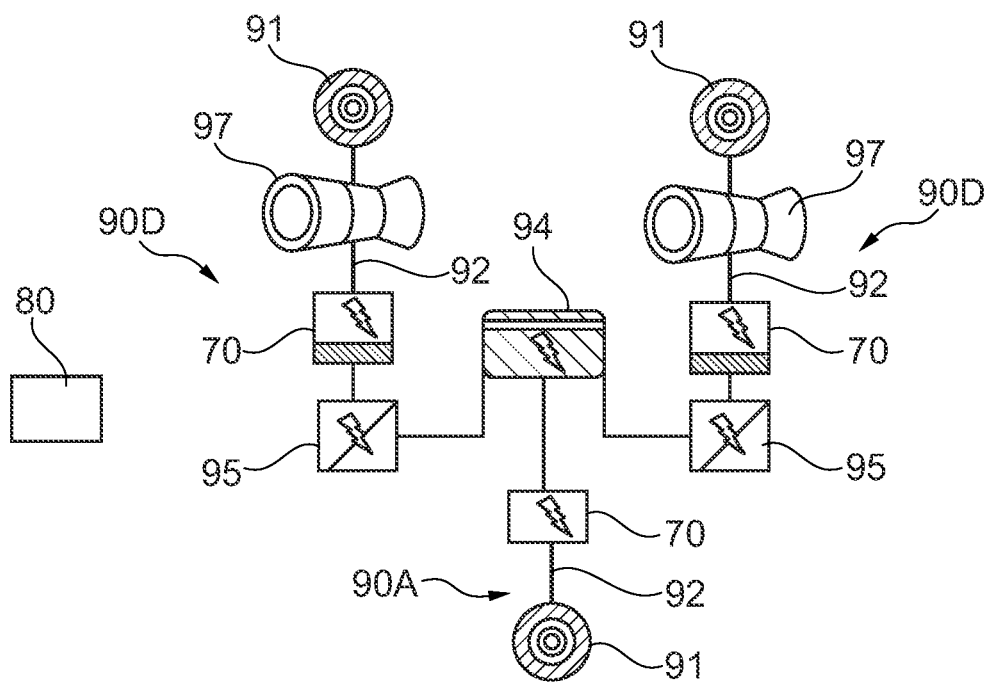

FIG. 19 shows a system, e.g., for an airplane, with a parallel hybrid configuration. Therein, two (alternatively one or more than two) drivelines 90D are provided. Each of the drivelines 90D comprises a turbomachine 97 that drives one or more bladed rotors 91, e.g., a compressor, fan, or propeller via at least one shaft 92. The bladed rotors 91 may be outside of the turbomachine 97, such as in a turboprop configuration, or the bladed rotors 91 may be integrated in the turbomachine, such as in a turbine engine, a turbofan or a geared turbofan.

The turbomachine 97 of each of the drivelines 90D drives, and can be driven by, an electrical machine 70 in the form of a motor-generator via a (another) shaft 92. The electrical machines 70 of the drivelines 90D are electrically connected, via power electronics 95, with an energy storage 94. The drivelines 90D may thus be driven by electrical power from the energy storage 94, and they may charge the energy storage 94, e.g., depending on a current power demand and/or charge level of the energy storage 94.

The system further comprises a driveline 90A as described above in detail with reference to FIG. 16, with an electrical machine 70 in the form of an electrical motor driving a bladed rotor 91 via a shaft 92, and receiving power from the energy storage 94.

It is worth noting that the systems of FIGS. 16 to 19 may comprise more or less than the number of drivelines 90A-90D shown.

Figure 20:
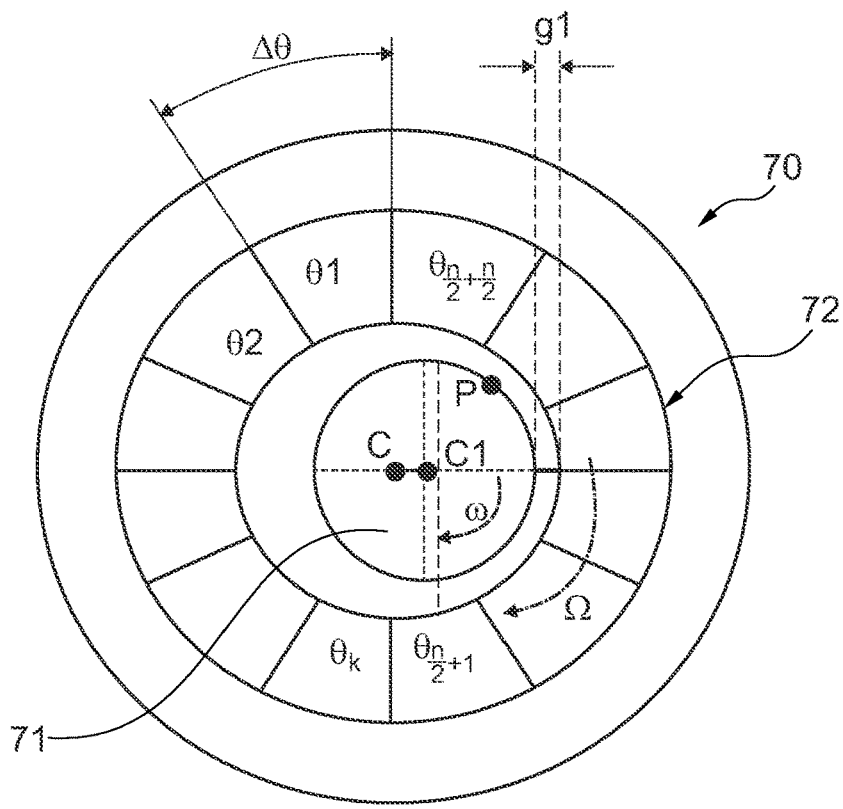
FIGS. 20 and 21 show an electrical machine.

FIG. 20 shows an electrical machine, similar to FIGS. 9 and 10 described above. In addition, it is shown that the systems and methods described herein using an electrical machine 70 allow to measure the frequency of sub-synchronous orbits as a time-of-flight of gap g1 and/or a point P between two coils or coil sectors (consecutive or not consecutive). In the Figure, ω denotes the rotational speed of the rotor 71 with respect to the stator 72. Further, $\Omega = 2\pi f_{orbit}$, wherein $f_{orbit}$ is the frequency of the orbiting motion of the rotor 71. The electrical machine 70 comprises n coils.

By means of the signals measured by means of the plurality of n coils, thus, the precession frequency of the rotor 71 may be determined. This determination can be made with particularly high precision, because the electrical machine 70 itself is used, instead of additionally mounted sensors.

Figure 21:
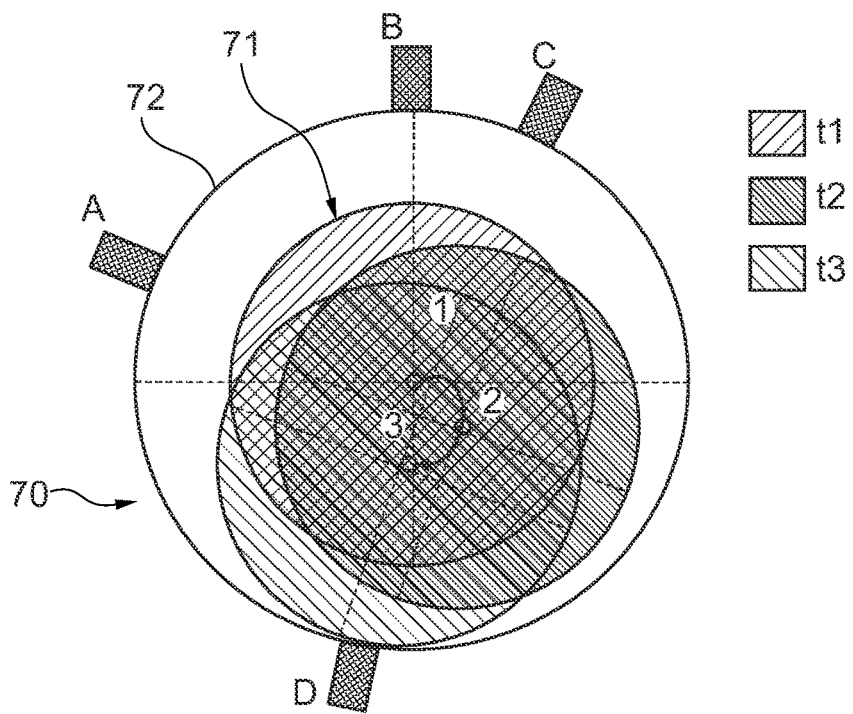

FIG. 21 illustrates the position of the rotor 71 with respect to the stator 72 at three different times. As an example, a plurality of coils (in this example four coils A, B, C, D) can be used for measuring the orbits. The coils used for the measurement may be spaced from another with irregular distances, i.e., not equidistant (e.g., to measure different frequencies). A phase delay between the different coils used as sensors may be used to determine a frequency of the orbiting motion of the rotor 71.

Figure 22:
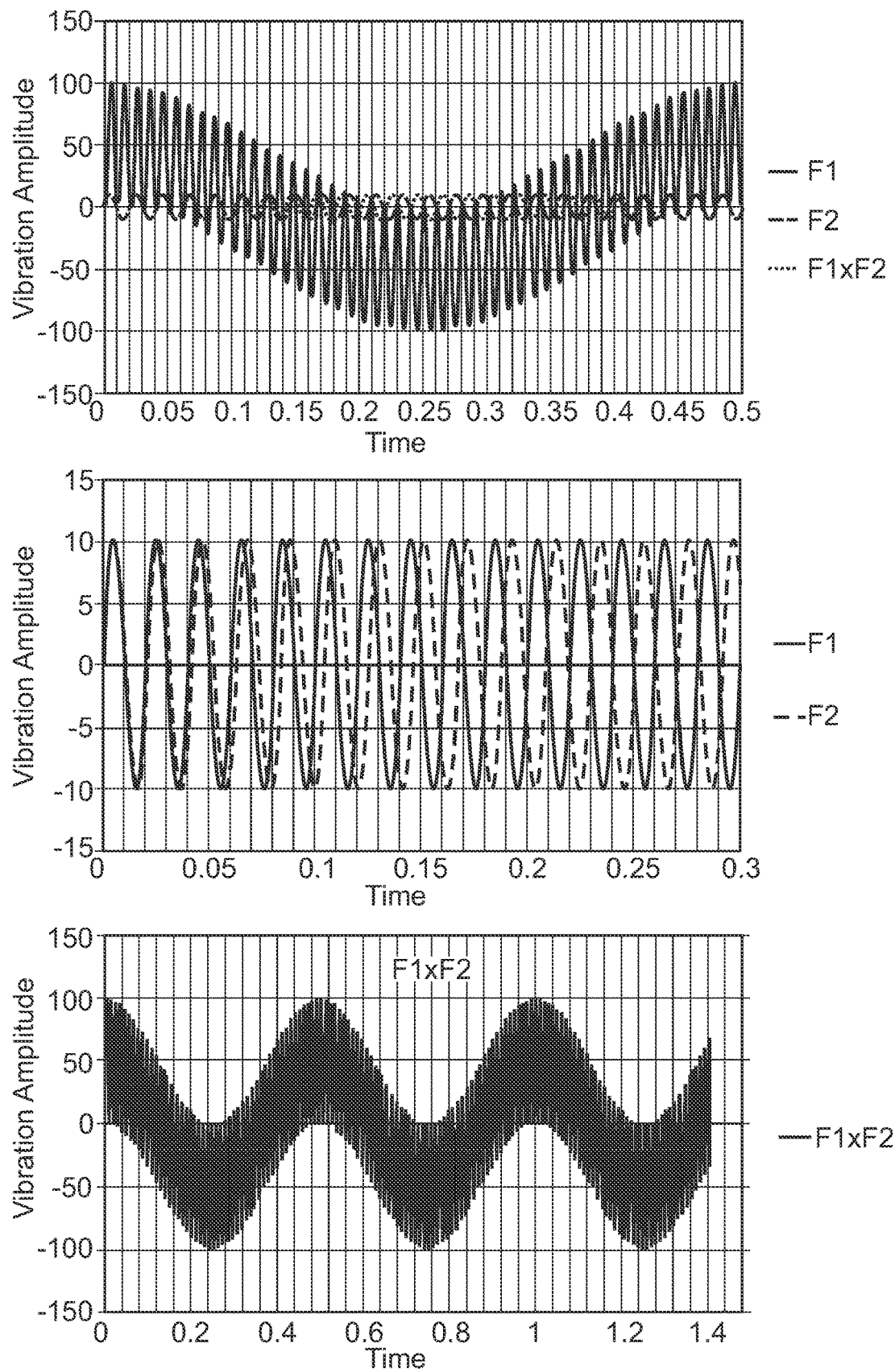
FIG. 22 shows forces and beatings that may occur by exciting vibrations between shafts.

FIG. 22 shows three diagrams with the time on the x axes (with different scales) and vibration amplitudes on the y axes. The diagram in the middle shows vibrations exerting forces F1, F2 of two mistuned shafts (e.g., shafts of a system of one of FIGS. 16 to 19). The lower diagram shows the resulting product F1×F2. The curves of the lower two diagrams are both shown in the upper diagram.

An analysis algorithm of the analysis unit 80 may track and monitor frequencies of beatings that are due to difference and sum of frequencies that are generated by dynamic forces acting on the different shafts of hybrid and electrical systems (e.g., engines, e.g., propeller or fan 1, 2, . . . n in FIGS. 16 to 19). In addition, the speed ratios may also be monitored, because specific ratios may be prone to generate cross-shaft vibrations, not only on the rotors but eventually on the airframe, potentially with a series of consequences, e.g., noise, cabin vibration, unwanted aerodynamic effects and the like. Further, the analysis unit 80 may be adapted to perform a detection of a trend of a vibration versus time at a characteristic (e.g., predetermined) frequency, that may, for example, be due to an aerodynamic instability, such as flutter or compressor stall. The algorithm may also account for the possibility of having such unstable vibrations present on different rotors and at slightly different frequencies, e.g., on a fan shaft and/or on a propeller shaft in the same power plant (the sum and difference of the frequencies will appear on the airframe and can cause detrimental interaction with the control systems). In particular, integer speed ratio between different engine rotors that are not spinning at a fixed ratio may also be monitored by the analysis unit 80, and, optionally, be mistuned by means of sending signals to an engine active speed controller.

Figure 23:
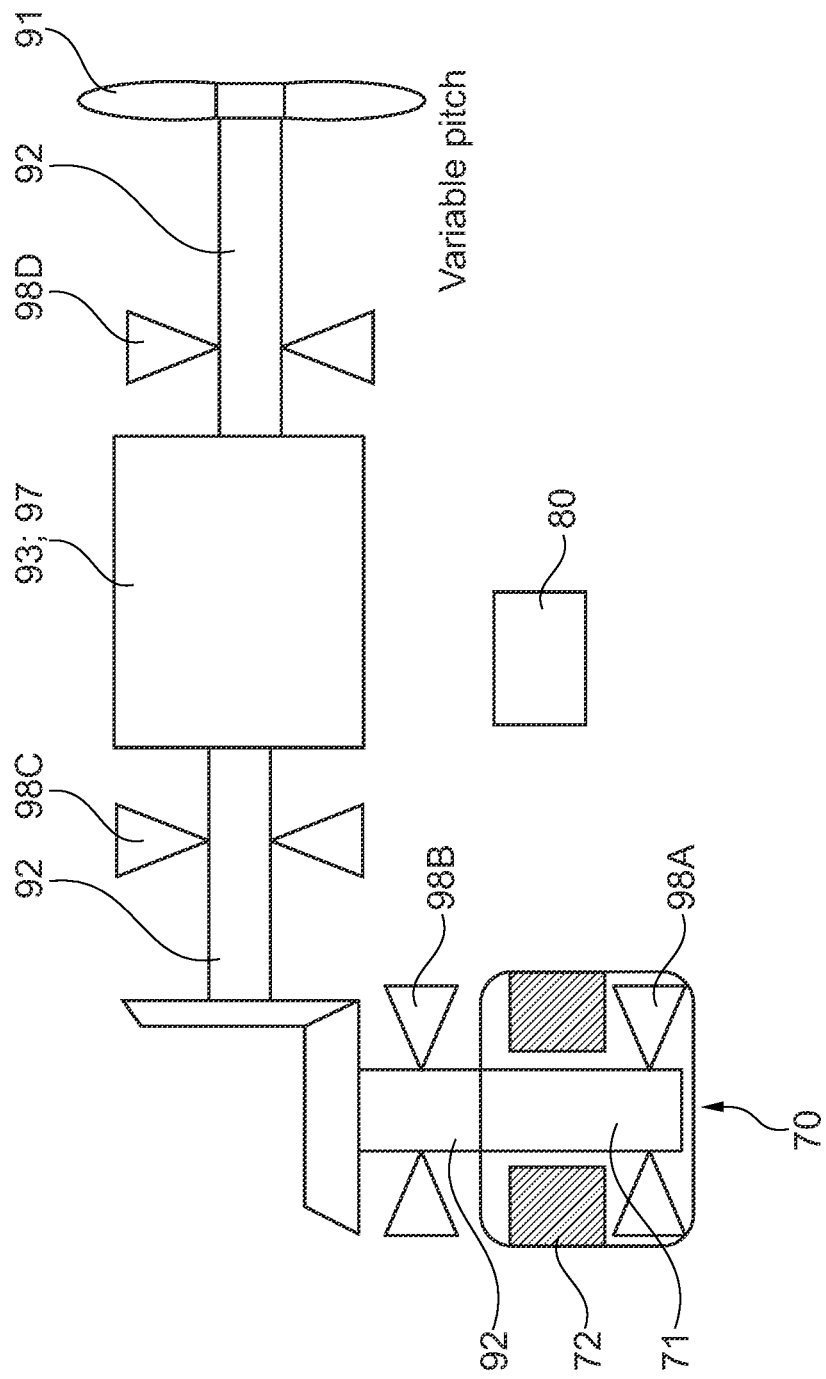
FIG. 23 shows a system with a vertically arranged electrical machine.

Turning now to FIG. 23, an optional setup of a system will be described. Therein, an electrical machine 70 in the form of an electric motor, or motor-generator, drives a shaft 92 with its rotor 71 (which are shown as one piece here, but could be separate pieces). This shaft 92 is mechanically coupled with another shaft 92 via gears, more precisely, via conical gears in this example. These shafts 92 are rotatable about rotational axes that form an angle, in this case of 90 degrees. In other words, the shafts 92 rotate about perpendicular axes. The shaft 92 that is driven via the gears, is mechanically coupled with a rotating machinery, such as a gearbox 93 (in particular, a power gearbox, PGB), e.g., the gearbox described with reference to FIG. 4, or a turbomachine. The gearbox 93 or turbomachine 97 drives a bladed rotor 91, e.g., a fan or propeller, in particular with variable pitch of the blades, via a shaft 92.

Bearings 98A and 98B rotatably support the rotor 71 and shaft 92 of the electrical machine 70. Bearing 98C rotatably supports the input shaft 92 of the gearbox 93 or turbomachine 97 and bearing 98D rotatably supports the shaft 92 driving the bladed rotor 91.

FIG. 23 shows a configuration that may address vibration monitoring (using analysis unit 80) of a vertical e-drive and a conic transmission in between the turbomachine and/or the PGB-to-propeller assembly. This system allows an improved stability during critical speed crossings compared to a horizontal architecture (where the electrical machine is horizontally located and the transmission aligned to the e-drive output shaft). This system allows a high level of uncoupling of torsional vibrations between the electrical machine 70 and the turbomachine 97 or gearbox 93 shafts 92, including the bladed rotor 91, due to the conical transmission. Further, a high level of uncoupling between lateral and axial vibration modes between the electrical machine 70 and the turbomachine 97 or PGB, shafts 92 and bladed rotor 91. Moreover, the alignment of the electrical machine 70 is highly independent from the alignment of the turbomachine 97 or gearbox 93, because it can rely on a precise centering that is determined by potentially tight tolerances of the transmission. Furthermore, this system has highly damping design capabilities. Since the driveline would benefit of said geometrical uncoupling, the dampers can be designed almost independently for the drive and the turbomachine 97 or gearbox 93. Even further, an integrated output bearing 98B, that exerts radial forces produced by the electrical machine 70 as unbalanced pulls and/or in the form of a magnetic bearing can also have also the function to bear an axial force (thrust) in the system. Horizontal forces can be monitored and actively reduced by reading and controlling the unbalanced pulls in the electric machine 70, which could also be referred to as being "super-gauged". For example, by active damping and/or a change in stiffness generated in the electrical machine 70 and or magnetic bearing 98B. Optionally, axial displacements in the turbomachine 97 and/or gearbox 93 and/or bladed rotor 91 can be monitored and, optionally, controlled using the electrical machine 70 (e.g., by means of unbalanced pulls).

Figure 24:
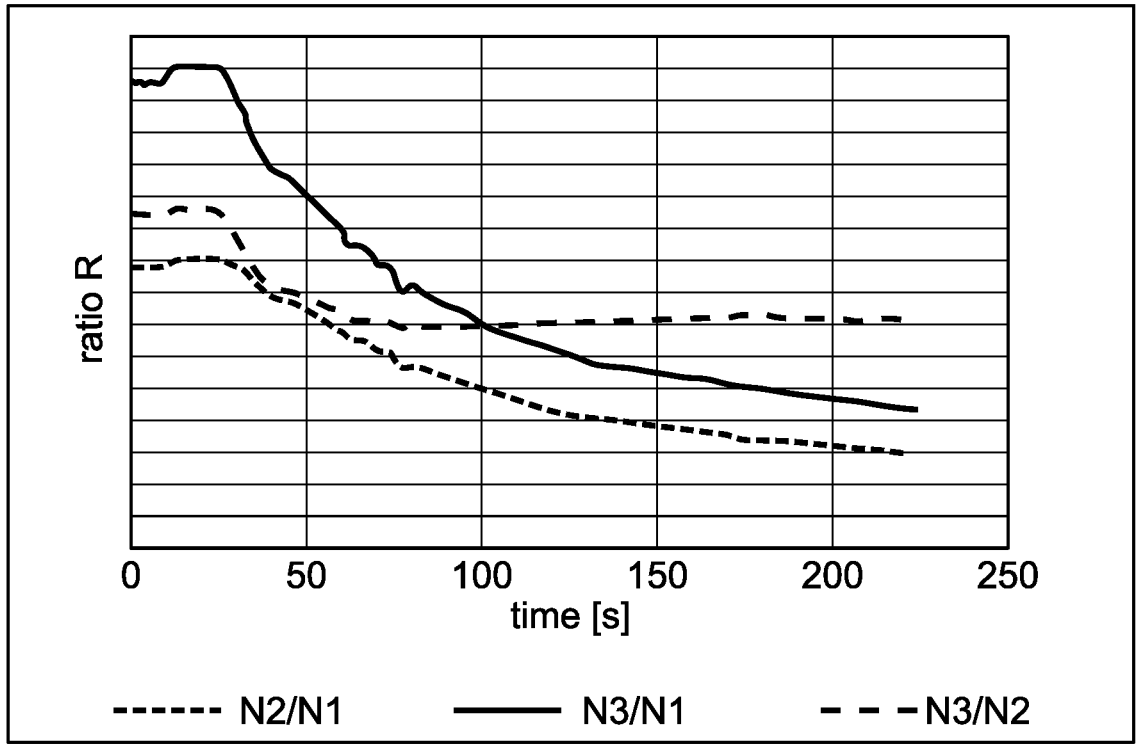
FIG. 24 shows shaft speed ratios of a gas turbine engine with three shafts versus time during acceleration.

FIG. 24 shows shaft speed ratios R versus time of an aircraft gas turbine engine with three shafts, herein denoted as N1-N3, during an acceleration of the engine. The three different curves show the speed ratios of the three combinations of the shafts N1-N3. The curve N3/N2 is shown at a different scale than the other two curves. From FIG. 24 it becomes apparent that the shaft speed ratios R may substantially change during operation of the gas turbine engine. It is worth noting that in this example the gas turbine engine does not comprise a power gearbox. All the speed ratios R are defined by speed controller performance targets.

Figure 25:
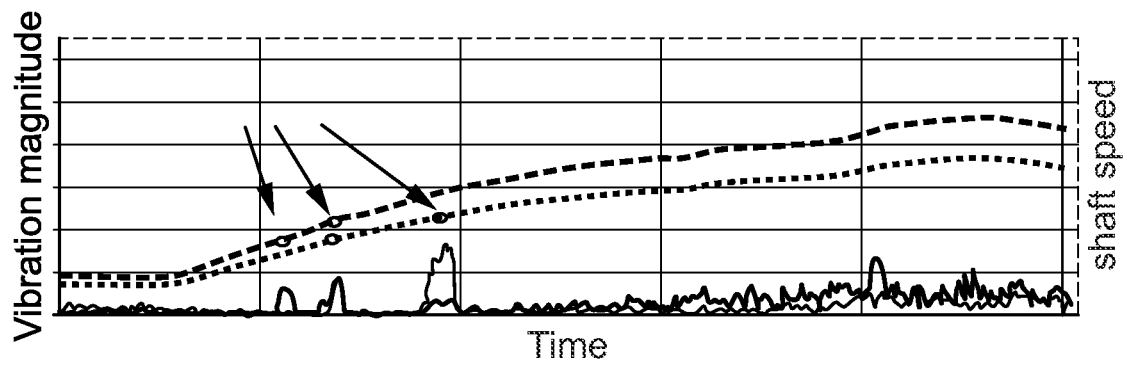
FIG. 25 shows the increase of vibrations in the region of integer shaft speed ratios.

FIG. 25 shows in thick and thin lines and versus time shaft speeds (dashed lines) and vibration magnitudes (solid lines) of two shafts of a gas turbine engine as an example for any kind of a machinery having two or more shafts that are rotatable at variable speed ratios. The dots represent integer speed ratios.

Imbalances of the shafts and/or other components may lead to vibrations of the shafts. Then, one of the shafts may excite a vibration of another one of the shafts. This occurs particularly in dependence on the ratio of the rotational speeds of the shafts.

Arrows in FIG. 25 point at several occurrences of integer shaft speed ratios. It becomes clear from FIG. 25 that at these points in time, the vibration magnitudes at the sensor locations are strongly increased with respect to neighboring points in time where the shaft speed ratios R are far enough from an integer.

Figure 26:
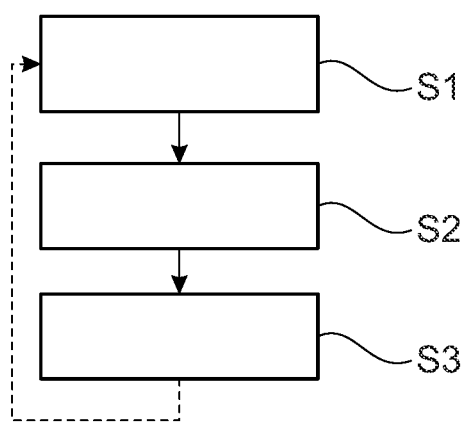
FIG. 26 shows a method for controlling a system having at least a first shaft and a second shaft.

FIG. 26 shows a method for controlling a system having at least one rotatable component that is rotatable with respect to another component, e.g., a first shaft and a second shaft, that are rotatable with a variable ratio of speeds, e.g. any of the systems described above. The method is for reducing vibrations in the system.

The method comprises a first step S11 of determining a speed of the first shaft and a speed of the second shaft. This may comprise receiving, by the analysis unit 80, sensor readings from corresponding speed sensors.

The method further comprises a second step S12 of calculating a speed ratio R of the determined speeds of the first and second shafts (or other components of the system) and determining whether or not the calculated speed ratio R is within a predetermined interval (e.g., +/−10% or +/−5%) around an integer value. Alternatively or in addition, the interval may be defined around an integer Ri as ($\sqrt[2]{(Ri^2-k)}$, $\sqrt[2]{(Ri^2+k)}$), wherein k is an integer, in particular a positive integer, e.g. 1. The variable k may particularly be selected such that each of the two limits of the interval assumes a value between the integer Ri and the respective next lower (Ri−1) or higher (Ri+1) integer. The integer Ri may be 1 or, in particular, larger than 1. The above interval allows wide flexibility in usable speeds while at the same time avoiding speed ratios that are prone to create strong vibrations.

The method further comprises a third step S13 of controlling rotation of the at least one of the shafts (or other components) depending on the calculated speed ratio R including restricting the rotation of the shafts (or component) to predetermined speed ratios by increasing or decreasing a speed of at least one of the shafts (or components) so as to avoid an integer ratio of speeds thereof and to avoid a ratio of speeds within the disallowed interval.

The method may stop after the third step S13, or return to the first step S11 thereafter.

Figure 27:
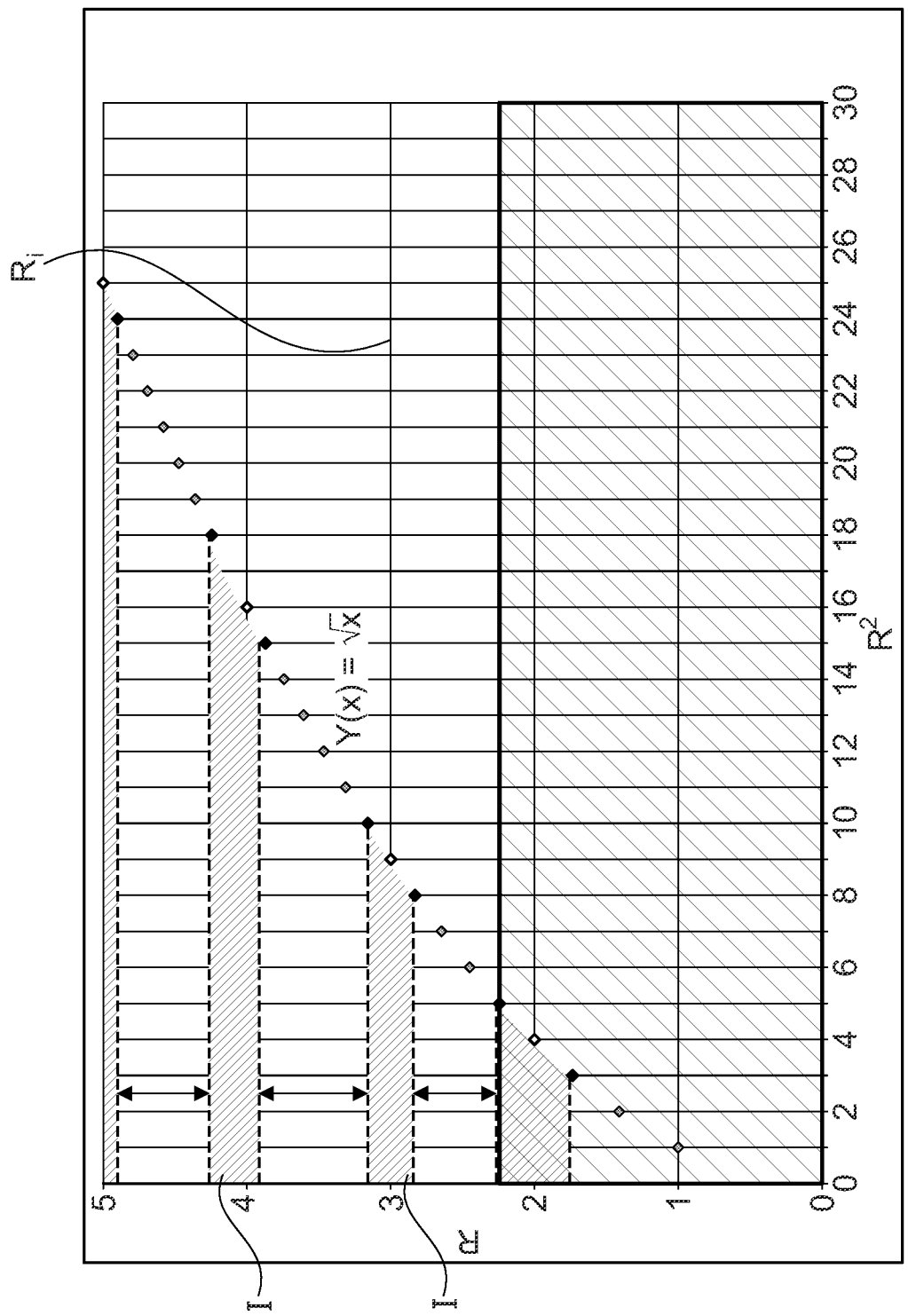
FIG. 27 is a diagram showing integer values of speed ratios and disallowed intervals around these integer values, as well as allowed intervals for speed ratios of components of a system between the disallowed intervals that are obtained with a parameter k that equals 1.

With reference to FIG. 27 a definition of intervals I is now described. FIG. 27 shows possible values for the speed ratio R of two components of the system rotating at a variable ratio of speeds. When controlling the system, disallowed ranges of speed ratios R are avoided.

FIG. 27 shows on the x axis the squared speed ratio R, $R^2$, and on the y axis the speed ratio R. The points shown in the diagram correspond to different specific speed ratios R at their corresponding $R^2$ value, so the values on the y axis follow the square root of the x axis value.

Various horizontal lines depict integer speed ratios Ri. The areas between dashed horizontal lines around the integers Ri depict intervals I that are disallowed or at least to be avoided, if possible, for system component speed ratios. The areas between these intervals I are allowed ranges for the speed ratios. The system is controlled such that at least a certain pair of two components, in particular all possible pairs of rotatable components, have speed ratios within the allowed ranges.

It has been found that by defining the interval I around at least one, in particular each integer Ri (or each integer Ri adjacent to possible speed ratios R of the system) as ($\sqrt[2]{(Ri^2-k)}$, $\sqrt[2]{(Ri^2+k)}$), wherein k is an integer, in particular 1, allows to set the edges of the disallowed interval I on an irrational number next to the adjacent integer Ri that provides an effective reduction of vibrations compared to integer Ri itself and the values inside the interval I. Advantages of the interval I defined as such are a simple calculation and a narrow, but effective definition of allowed and disallowed speed ratios R. This enables a simple control of systems while at the same time ensuring a small level of vibrations.

Thus, avoidance intervals across integer speed ratios are defined by irrational numbers. The interval I around an integer Ri may be asymmetrical.

It is worth noting that the analysis unit 80 described herein may be adapted in accordance with any on, some or all of the systems and embodiments described herein. The analysis unit 80 may be a part of a control system to monitor and control an engine with an electrical machine and/or a system with an electrical machine, as described herein.

The analysis unit 80 may apply an analysis algorithm that monitors rotor orbits with high sensitivity gauges (the corresponding electrical machine(s) 70) and, optionally in addition (see, e.g., FIG. 7) conventional sensors as (early) detectors, not only for vibration trends but also for electromechanical deterioration, e.g., performance drop, higher fuel consumption, noise increase etc. Due to the high number of relevant parameters a matrix describing the state of the system or engine can be built considering each sub system (e.g., the individual drivelines in FIG. 16-19) as a vector containing the corresponding parameters.

The analysis unit 80 may be adapted for detection and monitoring of cross-shaft vibrations that can be generated across the different drivelines of hybrid and electrical engines or systems (in series and or parallel). This feature addresses integer speed condition monitoring and avoidance. The control system with the analysis unit 80 may be adapted for active mistuning speed and the monitoring and avoidance of beatings, e.g., due to due speed ratios close to integer or to loss of synchronization and/or phase lags between different propellers or other rotatable components. The control system with the analysis unit 80 may comprise active functions and/or maintenance tasks optimized to reduce orbits and vibration based on an (early) detection of orbits (not only to reduce vibration but also to a performance deterioration (e.g., for saving fuel).

The analysis unit 80 may also be regarded as an engine health monitoring (EHM) system for an engine or a system with a plurality of engines and/or drivelines.

This EHM is adapted to detect vibrations that are related to a loss of alignment and/or changes in the original position of parts assembled together in the engine driveline due to mechanical degradation on rotating and static parts, in particular, of an aircraft engine. The signals described herein are analyzed using algorithms adapted for the detection of rotor orbits. It is worth noting that the early detection of rotor orbits and the capability to detect even small relative variations in their amplitudes, phase and frequency of the orbiting motion may also be determined. In particular the detection of sub-synchronous orbits, that are generated by gap-dependent loads, brings the ability to interrupt the performance deterioration and to reinstate the original conditions, by active controllers in case of reversible conditions and/or by dedicated maintenance tasks planned in an earlier and therefore better optimized manner. Electrical machines can be used to detect orbiting motions, because of their high sensitivity to gap-variations. The electrical machines controllers can also supply an active correction of the orbits based on EHM warning signals.

The frequency of the rotor precession and its phase, with respect to a fixed or to a rotating reference can be determined by measuring the "time of flight" that a certain wave of radial displacements (radial gap circumferential distribution or "wave") of the rotor with respect to a stator, or another rotor takes for traveling between two coils (not necessary consecutive coils). This is possible because the electrical output of a coil is different from its symmetrically arranged (opposing) coil when the radial gap of the rotor is not symmetrical, because the magnetic flux is different. The distance (known) between two (couples of) coils, which output may be used to measure the rotor orbit, is used to calculate a wave length of a rotating gap distribution by measuring the time of flight that the two (couples of) coils measure between a passage of a certain radial gap (that is orbiting). The time of flight is inversely proportional to the frequency of the orbits. The circumferential distance at which the coils that are used to measure the time of flight are located is chosen in several combinations in order to be able to detect different orbit frequencies or wave lengths. The wave length of a traveling wave L is related to frequency from the relation: Sound velocity (mean)=L/T where $T=\frac{1}{2}*\pi*$Frequency. Adjacent coils can measure higher frequencies. Therefore several coils, not equidistant each other, are advantageous in order to measure passages of orbits that travel at different frequencies. It is worth noting that the coils have a circumferential extension, so averaging operations may be performed on the electrical outputs and delays in the measurement of the time of flight needs to be taken into account.

For example during a processing phase, Fourier series can be used to interpolate orbits shapes. For example, the orbits measured in the electrical machine can be related to the orbits of other rotors in the driveline, for instance by FEM calculations and by preliminary vibration survey analysis or on bench/rigs tests, by using a matrix of influence coefficients. For example if the electrical machine is an electric motor connected to a sun gear of a planetary power gearbox, the sun orbit will be directly measured by the electrical machine whilst planet orbits and/or carrier orbits (that happen at different frequencies) can be obtained as secondary measure by means of a look up table (e.g., a matrix). It is worth noting that conventional vibration sensors may be used to correlate and integrate the orbit monitoring obtained by the electrical machine signals. The matrix may have the following dimensions: row=n where n is the number of electrical machines ("super gauges"), column=J number of rotors whose orbit can be sensed by the n electrical machines. The electrical machine signals and/or the conventional vibration sensor signals may measure absolute and relative motions (such as vibrations, orbits, acceleration, rotations, displacement etc.) whereas signals received by the analysis unit 80 from one or more engine controllers may determine power regulations (e.g., one or more of fuel/battery specific consumption, variable vane and nozzle regulations, propeller pitch, power loss across power gearboxes, air and oil temperatures and pressures are analyzed in the frequency, time and order domain).

Frequency, order and/or time domain of the signals may be analyzed by the analysis unit 80, and/or synchronous, harmonics orders (such as 2×, 3×, 4×, "z/n") and sub-synchronous orders (such as 0.1, 0.2, 0.3×rotor frequency) vibration may be extracted in magnitude, frequency and/or phase versus time. The analysis may also include the detection of variations in the state of a group of parameters related to the performance regulation of the engine, and/or compare the actual condition of the vibrational and power regulations states to a baseline. The baseline may be obtained by means of at least one of FEM, experimental tests, pass off tests, flight experience, e.g., differently combined in order to define the nominal condition (or state) of a particular engine within an engine family (fleet).

Further, the analysis unit 80 may monitor the gap-dependent vibration that appears in the signature as sub-synchronous frequencies (up to synchronous frequency coincident with 1/Rev of the rotor) of the rotor speeds in order to achieve an early detection of engine deterioration in several parts of the engine drivelines. The vibrations may be measured by a combination of (conventional) contact and non-contact sensors on engine shafts and/or housing and by output signals of the electrical machine(s), which are proportional to the gap variation in one or more of the drive rotors.

Optionally, a batch of digital and/or analog signals is generated based on the results of an engine state analysis that is sent, e.g., by a Peripheral Interface Controller (PIC) via a harness to the input of one or more active engine controllers in order to actuate regulation to minimize vibrations (for instance actuating an engine speed mistuning when the speed ratio is close to an integer).

Known frequencies may be tracked by the analysis unit 80 as mechanical condition indicators, such as first and second engine orders, blade passing frequencies, gear mesh frequencies and sidebands, bearing defect frequencies may be tracked and analyzed with Fourier, order and/or wavelet analysis and, optionally, shown in a convenient plot format (Real-Imaginary, Bode, FRFs, orbits, time history, Waterfall, campbell diagrams, state planes etc.). Optionally, a number of digital and/or analog signals based on the results of the engine state analysis that is sent by a Peripheral Interface Controller (PIC) via harness to the input of one or more active engine controllers (e.g., the control system with the analysis unit 80), in order to actuate regulations to minimize vibrations and reinstate performance targets.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A system comprising:
   a driveline including a rotatable first component rotatable about a rotational axis relative to another second component;
   an electrical machine including a rotor and a stator rotatable with respect to one another, the rotor being arranged to at least one chosen from drive the driveline and be driven by the driveline, the electrical machine being adapted to provide signals indicative of at least one chosen from 1) a motion and a force between the rotor and the stator and 2) a torque applied on the rotor; and
   an analysis unit adapted to receive the signals and to detect a vibration signature of the first component with respect to the second component based on the signals;
   wherein the electrical machine comprises a plurality of coils configured to supply at least a portion of the torque applied on the rotor, wherein the signals are produced by the plurality of coils, the signals being based on differences of at least one chosen from voltages or electrical currents of the plurality of coils.

2. The system according to claim 1, wherein a fluid is arranged in a clearance between the first component and the second component and wherein the rotor of the electrical machine and the rotatable component are fixedly connected to one another.

3. The system according to claim 1, wherein the signals are based on asymmetric magnetic forces in the electrical machine.

4. The system according to claim 1, wherein the analysis unit is adapted to detect the vibration signature within a predetermined frequency range, to determine a property of the vibration signature based on the signals at different points in time, and to generate a command based on a comparison of the property of the vibration signature with a predetermined threshold, and wherein the analysis unit is further adapted to generate a command based on a comparison of the property of the vibration signature with a predetermined threshold, wherein the property of the vibration signature comprises at least one chosen from a frequency, phase, amplitude and time-history trend.

5. The system according to claim 1, wherein the driveline further comprises at least one chosen from a turbine and a compressor.

6. The system according to claim 1, wherein the analysis unit is adapted to determine whether the received signals indicate that the vibration signature has a frequency within a predetermined frequency range, and an amplitude above a predefined threshold.

7. The system according to claim 1, comprising:
   two or more of the driveline, each including a rotatable first component rotatable about a rotational axis relative to another second component; and
   two or more of the electrical machine, each having a rotor and a stator rotatable with respect to one another, the rotor being arranged to at least one chosen from drive the driveline and be driven by at least one of the drivelines, the two or more electrical machines being adapted to provide signals indicative for at least one chosen from 1) a motion and a force between the respective rotor and the stator and 2) a torque applied on the respective rotor;
   wherein the analysis unit is adapted to receive the signals and to detect a vibration signature of each of the rotatable first components of the two or more drivelines with respect to the respective other second component based on the signals.

8. The system according to claim 7, wherein the analysis unit is adapted to control at least one of the two or more electrical machines and another controllable device of the system based on the vibrations detected with the two or more electrical machines.

9. The system according to claim 7, wherein the rotors of the two or more electrical machines are rotatable with a variable ratio of speeds with respect to one another, the analysis unit being further adapted for controlling rotation of the rotor of one of the two or more electrical machines depending on a speed ratio R of speeds of the rotors.

10. The system according to claim 9, wherein the analysis unit is further adapted for controlling rotation of the rotor of one of the two or more electrical machines depending on the speed ratio so as to avoid an integer ratio of speeds of the rotors of the two or more electrical machines.

11. The system according to claim 1, wherein the analysis unit is further adapted to determine a frequency of an orbiting motion of the rotor of the electrical machine.

12. The system according to claim 1, wherein the analysis unit is further adapted to determine at least one chosen from a time and a phase delay of signals measured by at least two of the coils of the electrical machine.

13. The system according to claim 1, wherein the rotor of the electrical machine is rotatable about an axis that forms an angle with the rotational axis of the first component with respect to the second component.

14. The system according to claim 1, wherein the rotor of the electrical machine is rotatably supported by a magnetic bearing.

15. The system according to claim 1, and further comprising a turbomachine rotatably coupled with the driveline, wherein an engine controller of the turbomachine is adapted to provide at least one signal to the analysis unit, and wherein one or more vibration sensors are arranged to measure and provide signals indicative for at least one of amplitude, frequency and phase of a vibration to the analysis unit.

16. The system according to claim 1, in an engine of an aircraft.

17. The system according to claim 16, comprising two or more of the driveline mounted on the aircraft spaced apart from one another, each driveline being coupled with one of two or more electrical machines, wherein at least one driveline is arranged at one wing of the airplane and at least another driveline is arranged at a different wing of the airplane.

18. A control system, comprising:
an analysis unit adapted to receive signals from an electrical machine having a rotor and a stator rotatable with respect to one another, the rotor being arranged to at least one chosen from drive a driveline and be driven by the driveline, the signals being indicative of at least one chosen from 1) a motion and a force between the rotor and the stator and 2) a torque applied on the rotor, wherein the analysis unit is adapted to detect a vibration signature of a rotatable first component with respect to another second component based on the signals;
wherein the electrical machine comprises a plurality of coils configured to supply at least a portion of the torque applied on the rotor, wherein the signals are produced by the plurality of coils, the signals being based on differences of at least one chosen from voltages or electrical currents of the plurality of coils.

19. A method for detection of vibration at a driveline including a rotatable first component rotatable about a rotational axis relative to another second component, wherein a rotor of an electrical machine is arranged to at least one chosen from drive the driveline and be driven by the driveline, the method comprising the steps of:
providing, by the electrical machine, signals indicative of at least one chosen from 1) a motion and a force between the rotor and the stator and 2) a torque applied on the rotor; and
detecting, by an analysis unit receiving the provided signals, a vibration signature of the first component with respect to the second component based on the signals;
providing that the electrical machine comprises a plurality of coils configured to supply at least a portion of the torque applied on the rotor, wherein the signals are produced by the plurality of coils, the signals being based on differences of at least one chosen from voltages or electrical currents of the plurality of coils.

20. The method in accordance with claim 19, for detection of vibration at two or more of the driveline, each including a rotatable first component rotatable about a rotational axis relative to another second component, wherein a rotor of one of two or more electrical machine is arranged to at least one chosen from drive at least one of the drivelines and be driven by a respective one of the drivelines, the method comprising the steps of:
providing, via each of the electrical machines, signals indicative of at least one chosen from 1) a motion and a force between the respective rotor and the stator and 2) a torque applied on the respective rotor; and
detecting, by an analysis unit receiving the provided signals, the vibration signature of each of the rotatable first components with respect to the respective other second components based on the signals.

* * * * *